United States Patent
Kuhns

(10) Patent No.: US 11,852,016 B2
(45) Date of Patent: Dec. 26, 2023

(54) ROCKET MINING SYSTEM, SUBSYSTEMS, COMPONENTS AND METHODS

(71) Applicants: Astrobotic Technology, Inc., Pittsburgh, PA (US); MASTEN SPACE SYSTEMS, INC., Mojave, CA (US)

(72) Inventor: Matthew Kuhns, Hawthorne, CA (US)

(73) Assignee: Astrobotic Technology, Inc., Pittsburgh, PA (US)

( * ) Notice: Subject to any disclaimer, the term of this patent is extended or adjusted under 35 U.S.C. 154(b) by 0 days.

(21) Appl. No.: 18/044,716

(22) PCT Filed: Aug. 17, 2021

(86) PCT No.: PCT/US2021/046396
§ 371 (c)(1),
(2) Date: Mar. 9, 2023

(87) PCT Pub. No.: WO2022/055673
PCT Pub. Date: Mar. 17, 2022

(65) Prior Publication Data
US 2023/0304403 A1    Sep. 28, 2023

Related U.S. Application Data

(60) Provisional application No. 63/076,378, filed on Sep. 9, 2020.

(51) Int. Cl.
*E21C 51/00* (2006.01)
*E21C 37/16* (2006.01)
(Continued)

(52) U.S. Cl.
CPC ............... *E21C 51/00* (2013.01); *B01D 8/00* (2013.01); *E21C 37/16* (2013.01); *F02K 9/425* (2013.01); *F02K 9/80* (2013.01)

(58) Field of Classification Search
CPC .............. E21C 51/00; B01D 8/00; F02K 9/80
See application file for complete search history.

(56) References Cited

U.S. PATENT DOCUMENTS 3,596,995 A * 8/1971 Fitzgerald ............... E21C 37/16
299/14
8,357,884 B1    1/2013 Ethridge et al.
(Continued)

FOREIGN PATENT DOCUMENTS

WO    WO 2016-172647    10/2016

OTHER PUBLICATIONS

Bahng, Seung Hoon. ISR/WO issued in PCT/US2021/046396, Korean Intellectual Property Office, Daejeon, Republic of Korea, Mailed Nov. 29, 2021.
(Continued)

*Primary Examiner* — Janine M Kreck
(74) *Attorney, Agent, or Firm* — Silver Legal LLC; Jarrett L. Silver

(57) ABSTRACT

Mining apparatuses, systems and methods related to the use of a rocket engine's plume and a collection manifold to efficiently displace, collect, process and store frozen volatiles embedded within or below a surface is disclosed. The plume contacts and churns up the surface. The frozen volatiles are displaced and/or evaporated within a closed environment under a collection manifold. The collection manifold has related components for addressing these frozen or gaseous volatiles downstream. Various apparatuses and subsystems are also disclosed including a rover, processing plants, collection manifold, and vapor manifold.

20 Claims, 13 Drawing Sheets

(51) Int. Cl.
    *B01D 8/00*         (2006.01)
    *F02K 9/42*         (2006.01)
    *F02K 9/80*         (2006.01)

(56) References Cited

U.S. PATENT DOCUMENTS

| | | | |
|---|---|---|---|
| 11,492,904 B2* | 11/2022 | Wright | E21C 37/16 |
| 2011/0168164 A1* | 7/2011 | Zillmer | B64G 1/16 |
| | | | 126/685 |
| 2012/0155966 A1* | 6/2012 | Zillmer | B64G 4/00 |
| | | | 405/128.85 |
| 2016/0002492 A1 | 1/2016 | Ethridge | |
| 2016/0024921 A1 | 1/2016 | Ethridge | |
| 2020/0240267 A1* | 7/2020 | Sercel | E21C 51/00 |

OTHER PUBLICATIONS

Diane Linne et al. Extraction of Volatiles from Regolith or Soil on Mars, the Moon, and Asteroids, Joint Planetary & Terrestrial Mining and Sciences Symposium / Space Resource Roundtable and in conjunction with the Canadian Institute of Mining Convention [online], Apr. 30, 2017 [retrieved on Nov. 17, 2021]. pp. 1-19, Retrieved from <NTRS—NASA Technical Reports Server, https://ntrs.nasa.gov/citations/20170009146>.
G. Sowers and C. Dryer, Ice Mining in Lunar Permanently Shadowed Regions, New Space, Dec. 16, 2019, vol. 7, No. 4, Colorado School of Mines, Golden, Colorado.

\* cited by examiner

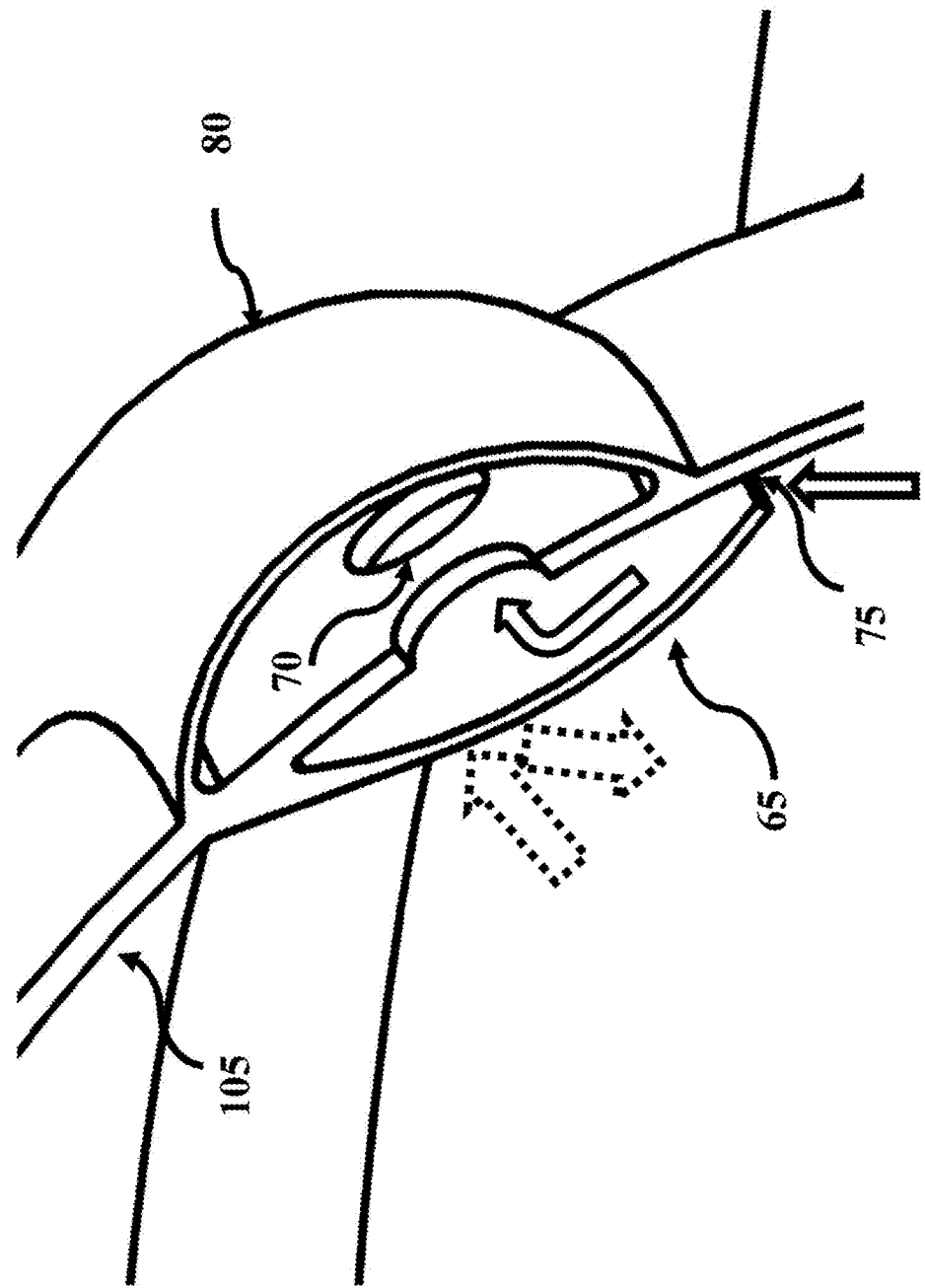

ROCKET MINING SYSTEM, SUBSYSTEMS, COMPONENTS AND METHODS

PRIORITY

This non-provisional application is a 371 National Stage application of PCT/US2021/046396 filed on Aug. 17, 2021 and claims priority to U.S. Provisional Patent Application Ser. No. 63/076,378 filed on Sep. 9, 2020. The respective subject matters of the PCT/US2021/046396 application and the '378 application are hereby incorporated by reference in their entirety.

BACKGROUND

Technical Field

The present application relates to the mining of frozen volatiles in a surface or subsurface using the plume of a rocket engine as a heat source and by eroding and mixing the regolith matrix.

Description of Related Art

Mining in a space environment, whether on the Moon, an asteroid or another planet, is critical to furthering space exploration and creating sustainable in-space economies. The lunar surface has frozen water and other subsurface materials that can be mined to create a foundation for sustainable habitation and as a source of rocket propellant. Asteroids also have resources that could be valuable in space or brought back to Earth.

SUMMARY

Applicant has developed a cheaper, faster way to mine frozen volatiles using methods, systems and devices centered around the plume of a rocket engine in a controlled pressure environment. The systems, methods and devices described herein each have several aspects, no single one of which is solely responsible for its desirable attributes. Without limiting the scope of the inventions as expressed in each of the claims that follow, some features are briefly described below and in the "Description" section.

In some example embodiments for a method of mining frozen or trapped volatiles from a surface or subsurface source, the method can include the steps of (1) combusting propellant within a rocket engine and creating a plume; (2) aiming the plume into or through the ground to heat a frozen volatile source within the ground or underground; (3) capturing volatiles released from the heated frozen volatile source using a collection manifold surrounding a ground access point of the plume; (4) removing the volatiles from the collection manifold; and (5) cold processing the volatiles in a condenser to condense the volatiles into liquid or solid form. Additionally, the step of combusting may include using the rocket to create a crater within the ground or churn the ground. Additionally, it may include increasing a pressure in the collection manifold to provide a less diffuse plume. The pressure can be increased at least until the plume collimates and forms standing shock waves to focus the energy at the ground and forms a deep crater to access the underground frozen volatile source.

In some embodiments, the rocket engine can be positioned closer to the ground to increase excavation depth. Additionally or alternatively, the rocket engine nozzle can be aimed at an angle relative to the zenith of the collection manifold to increase the area of the ground access point of the plume and excavate a larger volume, the collection manifold having a dome shaped upper portion.

In some embodiments, the volatiles are routed away from the collection manifold by extracting the volatiles with a volatile trap connected to the collection manifold and piping to carry the volatiles downstream toward a processing plant, which includes the condenser. Additionally, the pressure in the collection manifold can be higher than the pressure in the condenser, and optionally the pressure in the condenser can be higher than the outside pressure to boost efficiency in the condenser. Additionally, the condenser is a cold surface located in a processing plant. In some embodiments, the cold surface can include at least one cold plate in a cold trap conductively coupled to a radiator to increase efficiency. In some embodiments, the cold surface can include sufficient lengths of minimally insulated piping to condense the volatiles into a liquid, and optionally the lengths of minimally insulated piping to condense the volatiles into a liquid are heat exchanged with adjacent piping to carry colder liquids used as a heat exchanger.

Some embodiments include a step of setting a thrust level of the rocket engine that includes sensing pressure with a pressure transducer mounted within the collection manifold and adjusting a pulse rate of the rocket engine based on the sensed pressure from the pressure transducer. The step of setting the thrust level can further include sensing pressure from a second pressure transducer on a sealing lip of the collection manifold after the sealing lip has been inserted underground, and adjusting a pulse rate of the rocket engine based on the sensed pressure from the pressure transducer and the second pressure transducer, or it can include shutting the rocket engine off based on a sensed rise in underground pressure from the second transducer increasing above a detection limit indicating a leak or a failure of the regolith structures. Additionally or alternatively, the step of setting a thrust level of the rocket engine can include sensing pressure with a second pressure transducer mounted within the condenser collection manifold, and adjusting the pulse rate or the throttle of the rocket engine based on the sensed pressure from the pressure transducer and the second pressure transducer to maintain a state where condenser pressure is less than collection manifold pressure. Additionally or alternatively, the step of setting a thrust level of the rocket engine further comprises adjusting a relief valve that lets pressure out of the system based on the sensed pressure from the pressure transducer and the second pressure transducer to maintain the state where the condenser pressure is less than the collection manifold pressure.

In some embodiments, liquid water from a storage tank is separated using electricity into gaseous hydrogen and gaseous oxygen, and the gaseous hydrogen and gaseous oxygen are fed into the rocket engine as propellant. The electricity can be sourced from a solar cell, a battery, a fuel cell, or a radio isotope thermal generator. Some embodiments include electrolysing the water into hydrogen and oxygen and routing the hydrogen and the oxygen into respective storage tanks; and optionally using the oxygen as an oxidizer source and hydrogen as a propellant source for the rocket engine or a mining rover to power further mining or for refueling a spacecraft.

Some embodiments include lifting the collection manifold, positioning the collection manifold over a new volume of regolith to be mined, lowering the collection manifold over the new volume of regolith to be mined, and repeating at least the steps of combusting, capturing, removing and cold processing.

Some embodiments include securing the collection manifold to the ground through the application of groundward pressure using stakes, a mass of a rover or lander, drilled in anchors, or spring backed tension on the collection manifold mount. Some embodiments include sealing a junction between the collection manifold on the ground by vibrating or pounding the dome into the regolith.

Some embodiments include maintaining a pressure in the collection manifold underneath a maximum safe pressure by measuring pressure inside the collection manifold using a pressure transducer on an interior wall of the collection manifold, and continuously adjusting a throttle level of the rocket engine or by pulsing the rocket engine in short pulses to decrease the pressure to maintain a specified safety factor of allowed pressure in the collection manifold. Some embodiments include pulsing the rocket engine to break up the regolith at the plume impingement point.

Some embodiments include operating the rocket engine in the mining operation for a period of years by using a rover or lander to perform the mining operation, and periodically returning the rover to unload the condensed volatiles from on-board storage tanks into a long-term frozen volatile storage facility. Optionally, a battery on the rover can be recharged from a solar cell, a battery, a fuel cell, or a radio isotope thermal generator. Optionally, the rover can be refueled by a fuel source at, or on the way to, the long-term frozen volatile storage facility. Optionally, the rover can be refueled using on-board gaseous hydrogen that is formed by electrolysing water collected by the rover using electricity from a solar cell.

Some embodiments include increasing the plume length or excavation reach by at least one of increasing thrust of the rocket engine and increasing pressure within the collection manifold. Other embodiments include throttling and pulsing the rocket engine to completely evaporate the volatiles in the exposed underground source. Some embodiments include collecting and separating, from the volatiles, water vapor and at least one of nitrogen oxide, hydrogen sulfide, sulfur dioxide, ammonia, ethylene ($C_2H_4$), carbon dioxide, and methanol ($CH_3OH$).

Some embodiments include collecting solid matter from the mined regolith after volatiles have been removed from an underground frozen volatile source.

Optionally, the volatiles include freed water vapor from the underground source and propellant exhaust from the rocket engine. Some embodiments include the rocket engine churning and freeing the contents of the underground water source. In some embodiments, the ground is soil or regolith.

In other embodiments, groundward pressure is applied to the collection manifold to force a sealing lip extending groundward from sidewalls of the collection manifold to penetrate the ground and form a vapor barrier that prevents escape of volatiles from under the collection manifold. Optionally, the groundward pressure can be applied until the sealing lip has penetrated the grounds between 2 and 10 inches, or until the sealing lip has penetrated the grounds between 2.5 and 5 inches. Additionally or alternatively, the groundward pressure can be applied until a secondary sealing lip that extends inward and groundward from the collection manifold contacts or penetrates the ground. Optionally, the groundward pressure stops being applied such that a gap between the sealing lip and a secondary sealing lip remains at least partially above the ground, creating a channel along and above the ground.

Also described herein are deep-cratered mines created by the methods herein.

Some mining system embodiments include a rocket engine; a collection manifold; a volatile trap configured to remove volatiles from the collection manifold; a cold surface downstream from the volatile trap configured to condense one or more volatiles; a valve for controlling the condensed volatiles; a storage tank; and a vent configured to release some of the volatiles to the environment. In some embodiments, the rocket engine and the collection manifold are transported by the mobile rover. Optionally, the mobile rover contains solar panels and radiator systems in the mobile rover, and the mobile rover is programmed to move periodically to expose the solar panels to sunlight and the radiator to deep space.

Some collection manifold embodiments for capturing volatiles released by plume impingement include a collection manifold that defines an interior volume and is configured to disengageably seal with the ground to be engaged while mining and disengaged while offline or changing mining locations, a nozzle entry hole configured to seal or attach to a nozzle from a rocket engine; a vapor manifold configured to collect the vapors from the volatile collector; a volatile collector that routes the volatiles away from the interior volume into the vapor manifold; and a volatile exit from the vapor manifold. The collection manifold may include a sealing lip extending groundward from sidewalls of the collection manifold configured to penetrate the ground and form a vapor barrier that prevents escape of volatiles from under the collection manifold. Optionally, a secondary sealing lip, which extends inward and groundward from the collection manifold, is configured to contact or penetrate the ground upon insertion of the sealing lip into the ground. Additionally, a gap between the sealing lip and a secondary sealing lip can be configured to remain at least partially above the ground, creating a channel along and above the ground. Additionally, the sealing lip can extend at least 2.5 inches in length from where the collection manifold is configured to sit above ground level. Some embodiments include a cold trap and piping leading to a liquid storage tank. In some embodiments, the cold trap is a heat sink connected to a space-facing radiator. In other embodiments, any undesirable volatiles are vented to the environment. Optionally, side walls of the collection manifold can extend groundward into a circumferential lip that is configured to penetrate into the ground. Some embodiments include a regolith separator that prevents solid regolith particles from entering the path that exists in the collection vessel en route to the cold trap. Optionally, the regolith separator is a deflection plate extending from the collection vessel to prevent access of the regolith particles and provides access to volatiles to the volatile collector. Additionally or alternatively, a gap between the deflection plate and the collection vessel provides a channel configured to provide access to the volatiles.

Some processing plant embodiments for converting and separating a stream of volatiles include a sealed container in which volatiles can be processed; a space-facing radiator that serves as a cold trap; an inlet valve configured to input volatiles from the rocket manifold and regulate the pressure of the rocket manifold; and two outlet valves configured to remove processed volatiles from the sealed container; one outlet valve configured to regulate venting of volatiles to the external environment and to regulate the pressure of an upstream rocket manifold and one valve that regulates volatiles that have condensed upon exposure to the cold trap.

Some vapor manifold assembly embodiments include: a volatile trap that is a sheet with spaced input holes configured to allow volatiles to pass; a deflection plate that wholly covers the inlet to the volatile trip to minimize the amount of particulate matter reaching the volatile trap; a vapor manifold being a storage channel for collecting the volatiles outputted by the volatile trap; and a vapor exit being a connection for the volatiles to move downstream from the assembly, wherein along one edge of the deflection plate exists a narrow gap between the edge and the volatile collection that functions as a channel that allows volatiles to pass the deflection plate and enter the volatile trap while blocking most particulate matter from passing the deflection plate.

Some mobile rover embodiments include a mobile rover capable of traversing parts of the lunar landscape; a rocket engine supported by the mobile rover and positioned above the ground so that its plume will impinge the ground; a collection manifold supported by the mobile rover and sealed to and surrounding a nozzle of the rocket engine, the collection manifold being reversibly sealable to the ground; a space-facing radiator conductively coupled to a cold plate, the cold plate configured to condense and collect volatiles extracted from an underground source that has been disrupted and excavated by the plume impingement; and a storage container configured to store the collected volatiles.

Some water mining system embodiments include an excavation system comprising a rocket engine, a collection manifold, a condenser and a water storage tank; a plume from the rocket engine configured to penetrate regolith beneath the collection manifold; the condenser being configured to condense volatiles resulting from the plume penetration of the regolith; and the storage tank is configured to store water from the condensed volatiles in liquid or frozen form, wherein the excavation system weighs less than 150 kg and is configured to extract at least 400 kg of water in under 4 days.

In some embodiments, a method of mining frozen or trapped volatiles from a surface or subsurface source is described. The method can comprise a step of combusting propellant within a rocket engine, a step of creating a plume and then firing the plume into or through the ground to heat a frozen volatile source within the ground or underground, and a step of capturing volatiles released from the heated frozen volatile source using a collection manifold surrounding a ground access point of the plume.

In some embodiments, the method can comprise a step of removing the volatiles from the collection manifold and a step of cold processing the volatiles to condense them. The cold processing can take place in a cold trap or a cold processing plant. In some embodiments, the plume is used to churn up the ground, regolith, or soil.

In some embodiments, the plume is used to create a crater within the ground to access the frozen volatile source. In some embodiments, the plume is used to excavate a subsurface frozen volatile source intentionally using "deep cratering" effects.

Additionally or alternatively, a further step of riding the volatiles away from the collection manifold includes extracting them with a volatile collector connected to the collection manifold and using piping to carry downstream the volatiles to reach a processing plant or a cold trap. In either the processing plant or the cold trap, volatiles can be condensed using a cold surface. In some embodiments, the cold surfaces are conductively coupled to a radiator to increase efficiency. In some embodiments, the cold surfaces are sufficient lengths of minimally insulated piping to condense the volatiles into a liquid. Sometimes these lengths of minimally insulated piping to condense the volatiles into a liquid are heat exchanged with adjacent piping to carry colder liquids used as a heat exchanger.

In some embodiments, a rover or lander can carry out the above methods. Additionally or alternatively, a rover or lander can include an on-board water storage, a cold trap, and a collection manifold. The rover or lander can move around the collection manifold to access multiple locations within the ground. Additionally or alternatively, the rover or lander can move or angle the rocket engine to address a larger area underneath and beyond the collection manifold or blow away overburden to access the frozen water-bearing regolith more easily.

In some embodiments, the rocket engine can be moved closer to the ground as more volatiles are released, to excavate additional depth with the same plume length.

In some embodiments, the collection manifold can be sealed to the ground using stakes, the mass of rover or lander, drilled and anchors, spring back tension on the vessel mount, a lip that penetrates down into the regolith, or by weight of the clutch and manifold alone. The collection manifold can optionally be embedded in the regolith by vibrating it or pounding it until it reaches the desired depth.

There are additional features of frozen volatile mining using methods, systems and devices centered around the plume of a combustion engine that will be described hereinafter and that will form the subject matter of the claims appended hereto. In this respect, before explaining at least one embodiment of the ice mining system, the present invention is not limited in its application to the details of construction or to the arrangements of the components set forth in the following description or illustrated in the drawings. Drawings are not to scale unless otherwise stated.

BRIEF DESCRIPTION OF DRAWINGS

The accompanying drawings, which are incorporated in and constitute a part of this specification, illustrate examples, and together with the description, serve to explain the principles. The embodiments are not are not drawn to scale or limited to the shown configurations in the drawings.

FIG. 4 is a close-up view of Circle I of FIG. 3A, illustrating an exemplary vapor manifold.

In the drawings, like elements are numbered similarly across embodiments. In addition, features discussed elsewhere may not be numbered in each drawing even if present.

DESCRIPTION

Figure 1:
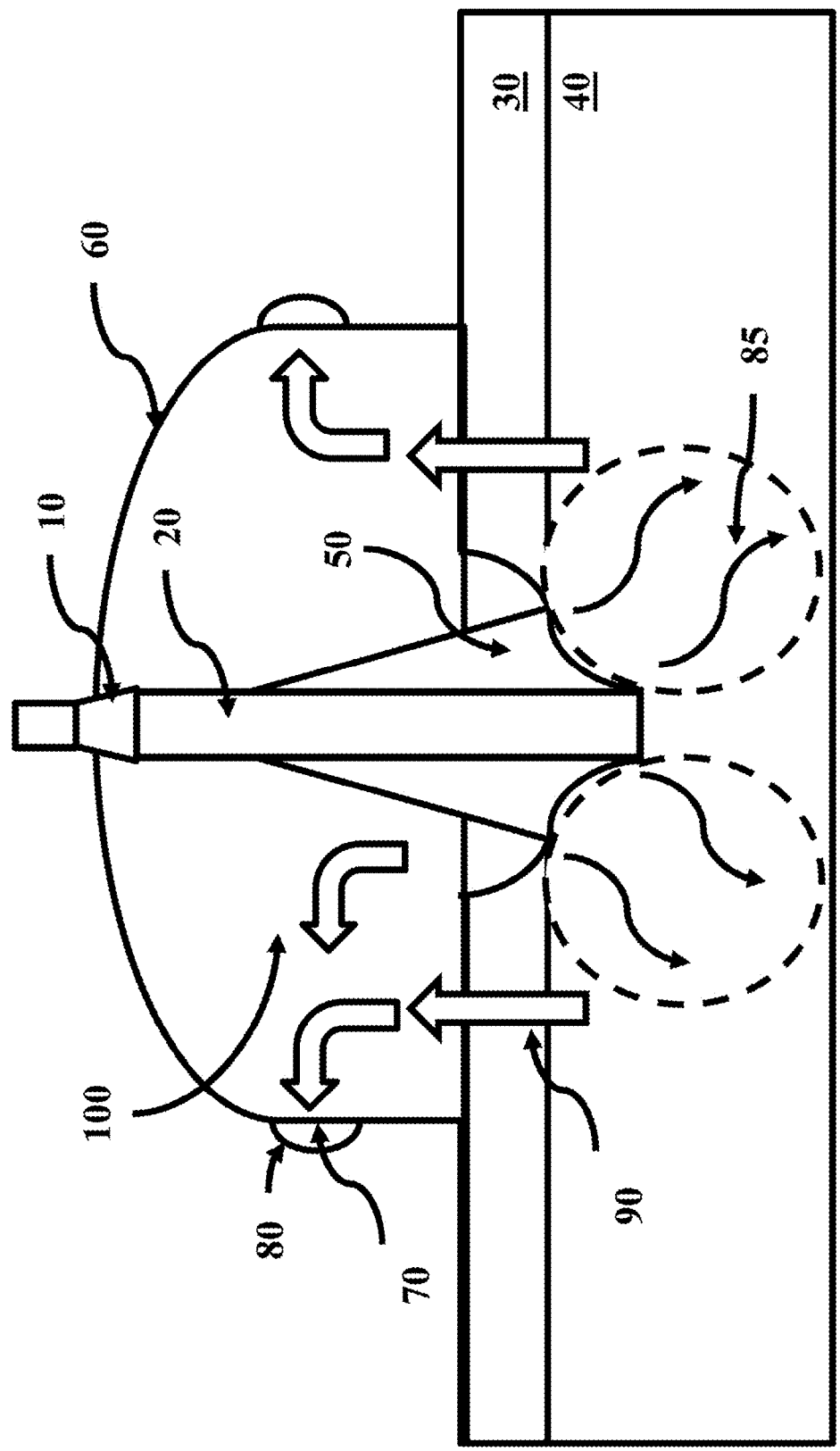
FIG. 1 is an illustration of an exemplary embodiment of a portion of a rocket mining system in operation including a collection manifold, a rocket engine, plume and crater.

The present application is directed to several embodiments conceived by Applicant to address the need for mining and excavating frozen volatiles in space.

The concept of thermal mining has been proposed as a solution to mine lunar ice. One or more heliostats were suggested as a way of using a concentration of sunlight as the thermal source. This approach is limited based on availability of solar energy, is slow and may require months or years to sufficiently heat the regolith, requires large infrastructure, and only heats the top surface of the regolith. Another approach is the use of conducting rods or heaters placed in boreholes. This requires making boreholes and lacks some of the advantages of the embodiments of the present application. Disadvantages of drilling solutions include large quantities of volatiles lost external to the bore hole, depth limited by drill length, high mechanical wear, high system mass, limited area effect, frequent maintenance requirements, and uncertainties concerning the type of material being drilled into where the wrong drill head can result in no penetration or mechanical failure. An example of the mechanical complexity and care which must be taken to drill on another world is the Curiosity rover on Mars, which in its first 6 years of operation only drilled 21 sample holes. This is an average of one drill hole every 3.5 months, which is too slow for an economical lunar mining operation. Applicant's solutions can address these deficiencies.

A benefit of the embodiments herein is that they can minimize the amount of mechanical equipment and eliminate the need for manual excavators, which on Earth require periodic maintenance and significant down-time. The mining industry on Earth uses massive equipment that needs to withstand severe wear and tear. For an economical lunar mining method that can function at least 5 years without maintenance, that approach is not feasible. Small rocket thrusters made from super alloys have been demonstrated to function in space for decades and withstand a million or more cycles. Applicant's solutions can incorporate such a reliable thruster as a heavy lifter in mining operations instead of the traditional mechanical excavator.

Utilizing the deep cratering effect can be a very efficient way to mine volatiles in space. The rocket mining embodiments allows for ice mining on the moon. The deep cratering effect can be an undesirable byproduct of vertical take-off/vertical-landing systems operating without an effective landing pad when there is enough pressure relative to rocket nozzle exit pressure to create a columnated plume. Utilizing standing shock waves known as Mach diamonds that create a tremendous concentration of directed energy enables high speed excavation through the regolith with minimal equipment necessary. The solutions herein can optionally benefit from these standing waves to quickly excavate a worksite. This focus of the directed energy at the ground helps with deep cratering, extending the effective reach of the plume. In addition, the solutions herein are compact, relatively lightweight, can be brought along on a spacecraft to the worksite, and can operate remotely and untethered from a rover or a lander. Additionally, the solutions proposed herein benefit from being able to excavate many types of regolith, including working around large rocks or extremely hard ice surfaces consisting of ice XI or other phases due to the nature and flexibility of this method of mining.

FIG. 1 illustrates an example rocket mining and excavation system. A plume 20 coming out of the rocket nozzle 10 is a result of the combustion of a rocket engine or similar engine. The rocket nozzle 10 is positioned inside a containment dome 60 so that the plume 20 impinges the regolith 30 into the subsurface frozen regolith 40. As the plume 20 strikes the regolith 30, it forms a crater 50, and the plume's and the plume impingement area's hot gasses 85 cause volatiles 90 to be released out of the regolith 30 or frozen regolith 40. The plume 20 also churns the soil, making the extraction of the volatiles 90 easier by exposing them to convective heating from hot plume gasses. As the volatiles 90 sublimate or evaporate and rise out of the regolith 30, 40, they are trapped in the manifold and then collected by volatile collectors 70 into a vapor manifold 80. The flow into the vapor manifold 80 is driven by a pressure gradient, as the vapor manifold has a lower pressure than the dome 60. This drives the volatiles through the system with no pumps or mechanical components other than a pressure control valve. Additionally, the combusted propellants 100 from the rocket engine, which among other things may be water vapor, can be efficiently processed to save energy as they are collected along with the freed volatiles. Downstream, the volatiles 90 will be condensed, as described later.

In environments with no or low atmosphere, rocket engine plumes lack the associated columnated form with Mach diamonds that is found on Earth. On Earth the atmosphere applies surrounding pressure on the rocket engine plume so that the plume does not expand and dissipate as quickly. On Earth, we see a phenomenon known as Mach diamonds, which are created by a standing shock wave emanating from the rocket engine. In a no- or low-atmosphere environment, by keeping the plume within the collection dome where the temperatures and pressures can be controlled, deep cratering is possible to extract more resources than only a plume without added pressure would allow.

In some embodiments, a higher-pressure environment within the dome 60 is used to maintain pressure on the plume 20 and allow for downward-pointing standing shock waves, e.g., Mach diamonds, from the rocket engine 10 through the plume 20 to the regolith 30, 40 that would not otherwise be possible in no- or low-atmosphere places. Mach diamonds are also known as shock diamonds or thrust diamonds. The pressures can be managed throughout the rocket mining system through selective venting in the collection manifold as well as downstream and by adjusting the amount of propellant input into the rocket engine.

The plume depth depends on engine thrust and dome pressure and can be tuned by altering these variables. An example plume depth of 1 m should be enough to start lunar ice mining based on the expected depth of water reserves. This method enables mining of deeper deposits than other methods, allowing access to frozen water that is outside of the permanently shadowed regions (PSRs) which makes thermal and power management of a rover more achievable and lower cost with solar panels versus batteries or radio-isotope heaters.

FIG. 1 illustrates features of an example pressure dome 60. The dome has a central region into which the plume 20 from a rocket engine nozzle 10 can operate on the regolith. In the center region, vapors can collect prior to being routed outside of the dome 60. Operating the rocket engine in this environment should create free volatiles and ejecta (dust). The volatiles 90 are routed from this center area through holes called volatile collectors 70 in the pressure dome 60 into a vapor manifold 80. The vapor manifold 80 is, but does not have to be, a single circumferential area around the dome, interior, integral or exterior to the dome, that stores the collected volatiles en route to the cold trap 150. The vapor manifold 80 could take other forms such as multiple periodically spaced manifolds or other vapor storage possibilities. Even a series of dome exits 110 could be a workable configuration. The cold trap 150 can be integrated with the vapor manifold on the pressure dome itself, or it could be downstream located elsewhere. An example vapor manifold 80 assembly is further shown in FIG. 5.

Figure 2:
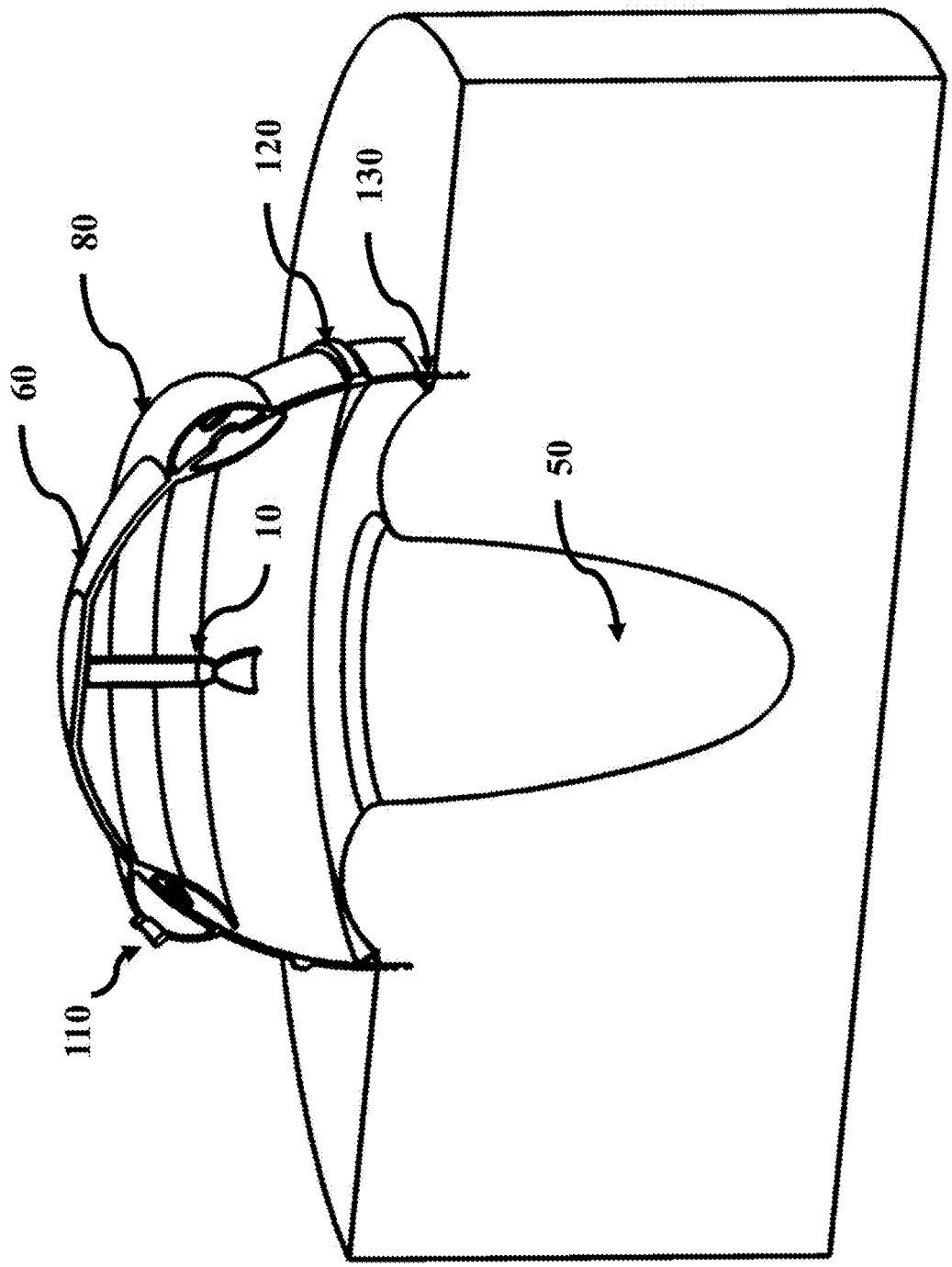
FIG. 2 is a cross-sectional view of an embodiment of the rocket mining system using a different collection manifold than that of FIG. 1.

FIG. 2 is a zoomed-out view of a cross-section of an example rocket mining system embodiment. Like that of FIG. 1, the system of FIG. 2 is a nozzle 10, collection dome 60 and vapor manifold 80. It additionally shows a deep crater 50. The collection dome 60 structure reinforced with stiffening rib 120 and sealed to the ground with a primary seal 130. Volatiles 90 can leave the dome exit 110. Dome exit 110 could lead the volatiles 90 to the cold trap 150 or be a vent 190 to the outside environment.

FIG. 2 shows the approximate scale of an engine, dome, and crater for an 85 kg mass system capable of delivery on a Commercial Lunar Payload Services lander. The engine is sized for 100 lb-ft thrust in a 1 psi dome environment to produce Mach diamonds and a columnated plume. Among other options, a titanium-based pressure dome or an abrasion-resistant metal liner with a composite overwrap could meet these mass requirements. Although it is possible for the vapor manifold 80 to have different shapes, this configuration of vapor manifold 80 enables easier handling of the dome shape for spaceship, lander, and rover transport.

Figure 3A:
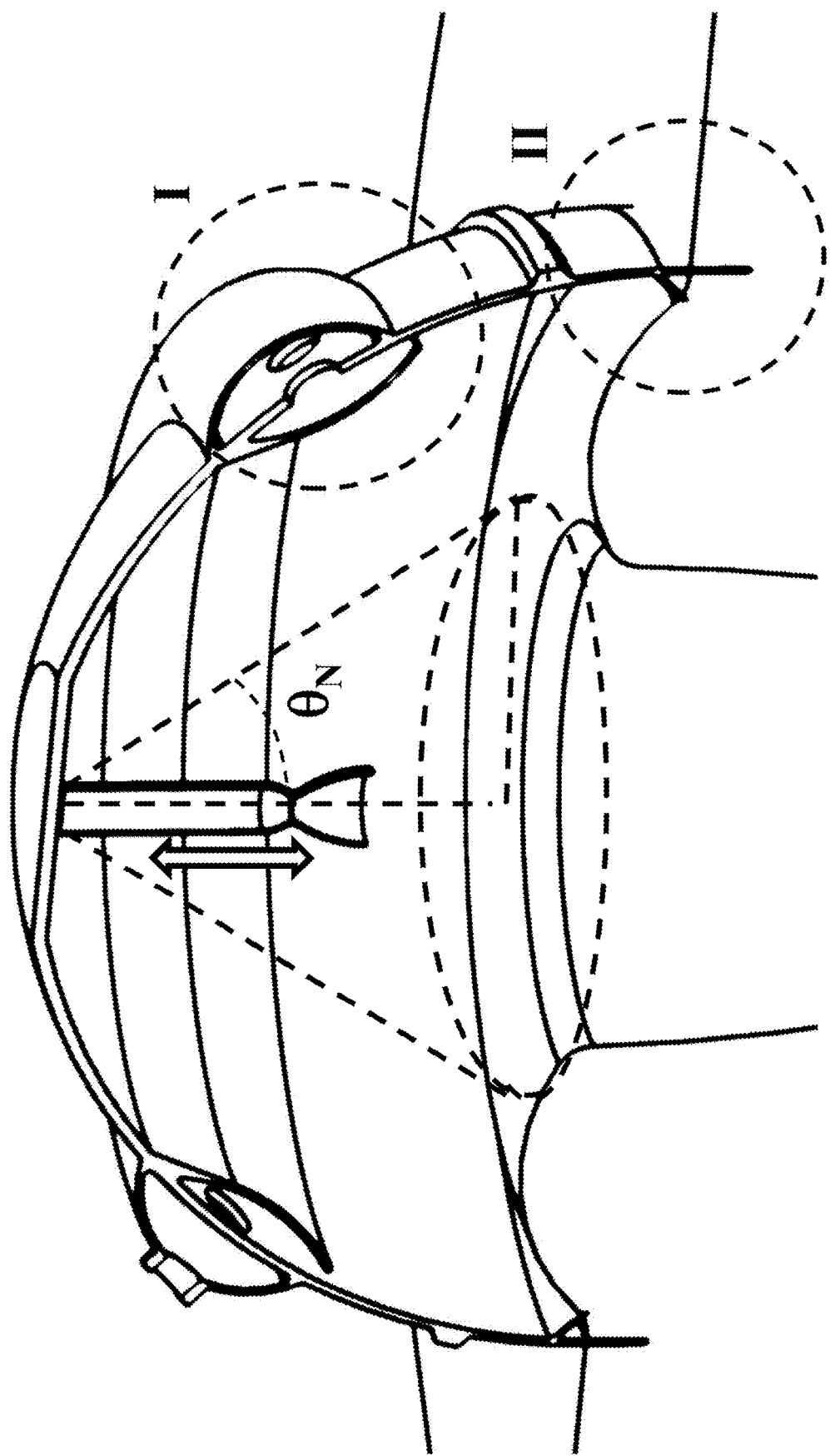
FIG. 3A is a close-up view of the embodiment in FIG. 2.

FIG. 3A is a zoomed-in view of the same cross-section of FIG. 2. FIG. 3A has dashed lines in a conical shape showing that the nozzle can be pivoted or angled at a range of a nozzle angles ON in some embodiments. Additionally, FIG. 3A shows an arrow showing that the nozzle can be translated upward or downward (groundward) for greater excavation depth. ON can extend from the perpendicular or other starting angle until as far the manifold or whichever manifold proximity distance prevents damage to the equipment. As discussed below, it is possible to excavate below and beyond the manifold wall.

Figure 3B:
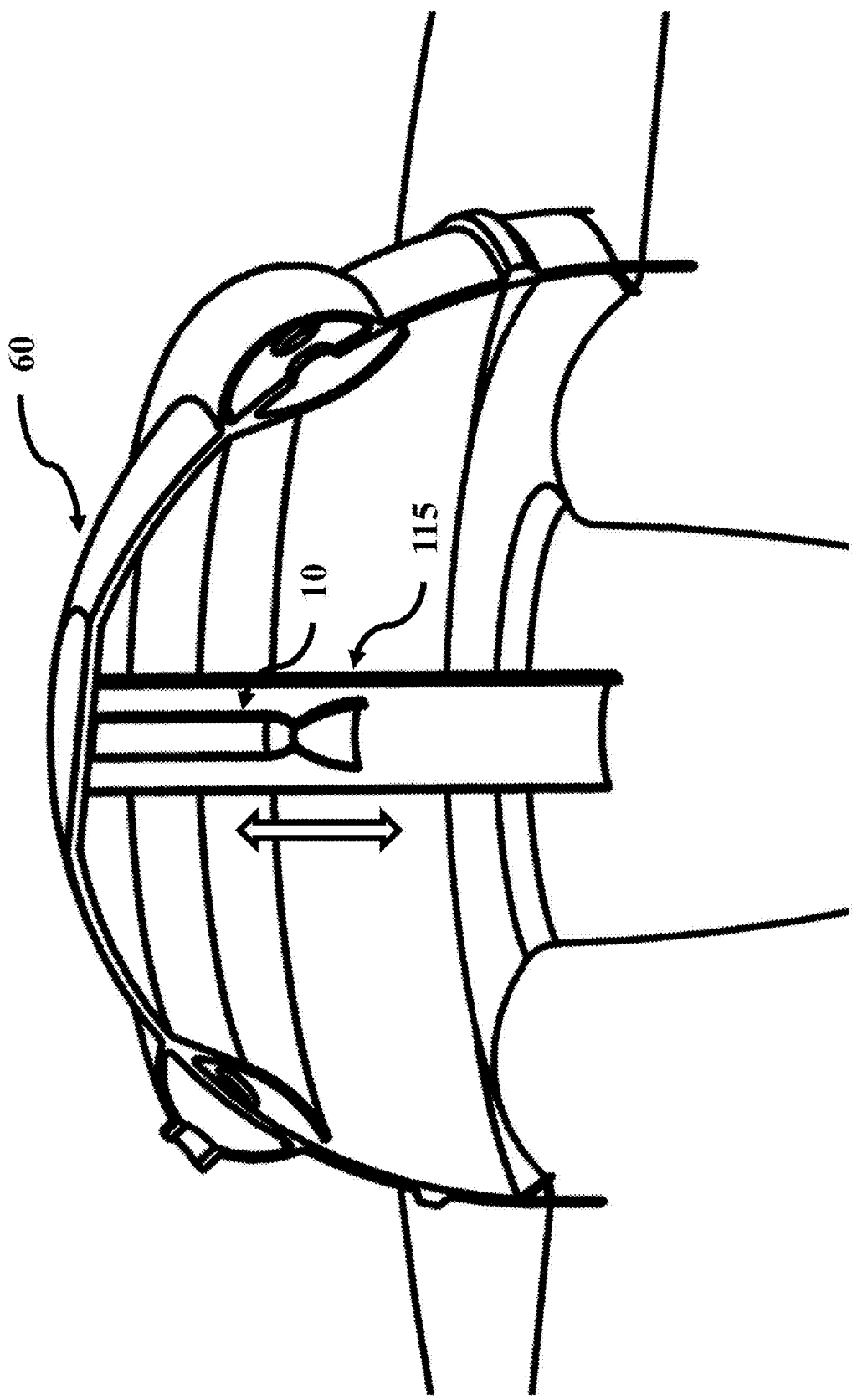
FIG. 3B is a close-up view of the embodiment in FIG. 2 and includes a sleeve.

FIG. 3B is a zoomed-in view of the same cross-section of FIG. 2 with a hyper pressure sleeve 115 added. The sleeve could be sheet metal or a 0.01-0.1-inch-thick component. Wires and fluid connections to the engine will all be external to the dome. The sheet metal can be connected to a linear or rotational actuator. Sealing around the sleeve can be achieved by standard methods to those familiar with the art. The sleeve can move as far down as the operator needs. The benefit of the sleeve is that it can locally concentrate pressure around the plume and extend the deep cratering effect while allowing lower pressure in the surrounding collection manifold. A lower dome pressure reduces the stress and downforce required to keep the dome secured to the surface.

FIG. 4 is a close-up view of Circle I in FIG. 3A highlighting how the volatiles 90 exit the collection dome. As previously discussed, volatiles 90 leave the collection dome 60 through volatile collectors 70 until they reach vapor manifold 80. Deflection plate 65 helps to reduce the ejecta (dust) (defined elsewhere) by blocking its entrance into the volatile collectors 70. There is a small volatile channel 75 that allows the volatiles to cross the deflection plate 65 and exit through the volatile collectors 70. The drawings herein depict vapor manifold 80 as a semicircular channel disposed on the exterior of the pressure dome that sits in the top half of the dome.

The interior of the collection manifold has an abrasion resistant surface 105. This is to protect the surface from the fast-moving ejecta that is likely to occur in this method of mining. Additionally, the cleaner and smoother the surface 105, the easier it is to maintain the rocket mining system. The inner layer is likely an abrasion resistant surface 105 that can be in the form of an inner liner. The abrasion resistant surface could be a base metal, or a coating such as a ceramic or plasma-deposited sapphire. An alternative approach could involve coating the inner surface with an adhesive or soft material, such as aerogel, to proactively trap ejecta and create a built-up layer of regolith armor to minimize erosion from continued operation.

Although not shown in FIG. 4, in some embodiments, the dome may have more than one layer. The abrasion resistance needs to be able to withstand the excavating environment in the central area and therefore has the abrasion resistant surface 105 as the innermost layer. A metallic or composite overlap structural layer may be integral with this inner liner or a separate layer. An outer insulation layer can also be used to help keep the heat in the central area and prevent vapor condensation on the dome due to the cold of the environment outside of the dome. An example of a collection manifold is a titanium inner layer with insulation on the outside. Insulation may consist of a vacuum gap between surfaces to prevent conduction and convection between the inner and outer surface. Insulation may consist of multi-layer insulation (MLI) to serve the same purpose. Insulation may consist of SOFI insulation to decrease conduction between the inner dome and outer surface.

The shape of the vessel is designed for efficiency and functionality of the rocket mining system but is open to significant variation. The optionally higher pressures in the collection manifold drive through volatiles to their designed exits at lower pressure. FIG. 1 and FIG. 2 have slightly different shaped domes to vessels. Although a dome shape is illustrated in this embodiment, other shape vessels are possible. Any shape that allows the plume penetration area, the buildup pressure around the plume, and the collection of volatiles can work. Regarding terminology, in embodiments where the collection manifold is a dome with the circular cross-section, features of that dome may be "circumferential." As this specification and claims also contemplate a non-dome-shaped collection manifold, and even though the term "circumferential" is used here in regard to a dome example, the term "circumferential" will equally apply to other non-circular shaped collection manifolds as well. In addition, circumferential does not automatically mean continuous. Many of the objectives can be achieved herein without continuity and without dome-shaped collection manifolds.

The seal of the rocket engine nozzle area and the seal under the collection manifold operate as predicates to effective operations and are intended to withstand the temperatures and pressures under the collection manifold. They need to be designed appropriately for their conditions. While only these seals will be discussed below, every opening and connection area is an opportunity for a volatile leak, and they should be sealed according to normal practices by a person of ordinary skill in the art.

The seal of the rocket engine can be a close fit attachment of the collection manifold to the rocket engine or the rocket engine nozzle directly or indirectly, or a separately added sealing mechanism. FIGS. 1 and 3 illustrate how the rocket engine nozzle comes directly into the collection manifold area. Based on the lunar environment a metallic seal or welded connection (if no translation is needed) is the preferred solution. For angular movement, the seal may involve flexible metallic bellows, with e-beam welded joints. To prevent puncture of the bellows by high velocity ejecta, they should be shielded from direct impingement. Any seal which may degrade due to regolith particle entrainment should be avoided.

Figure 5:
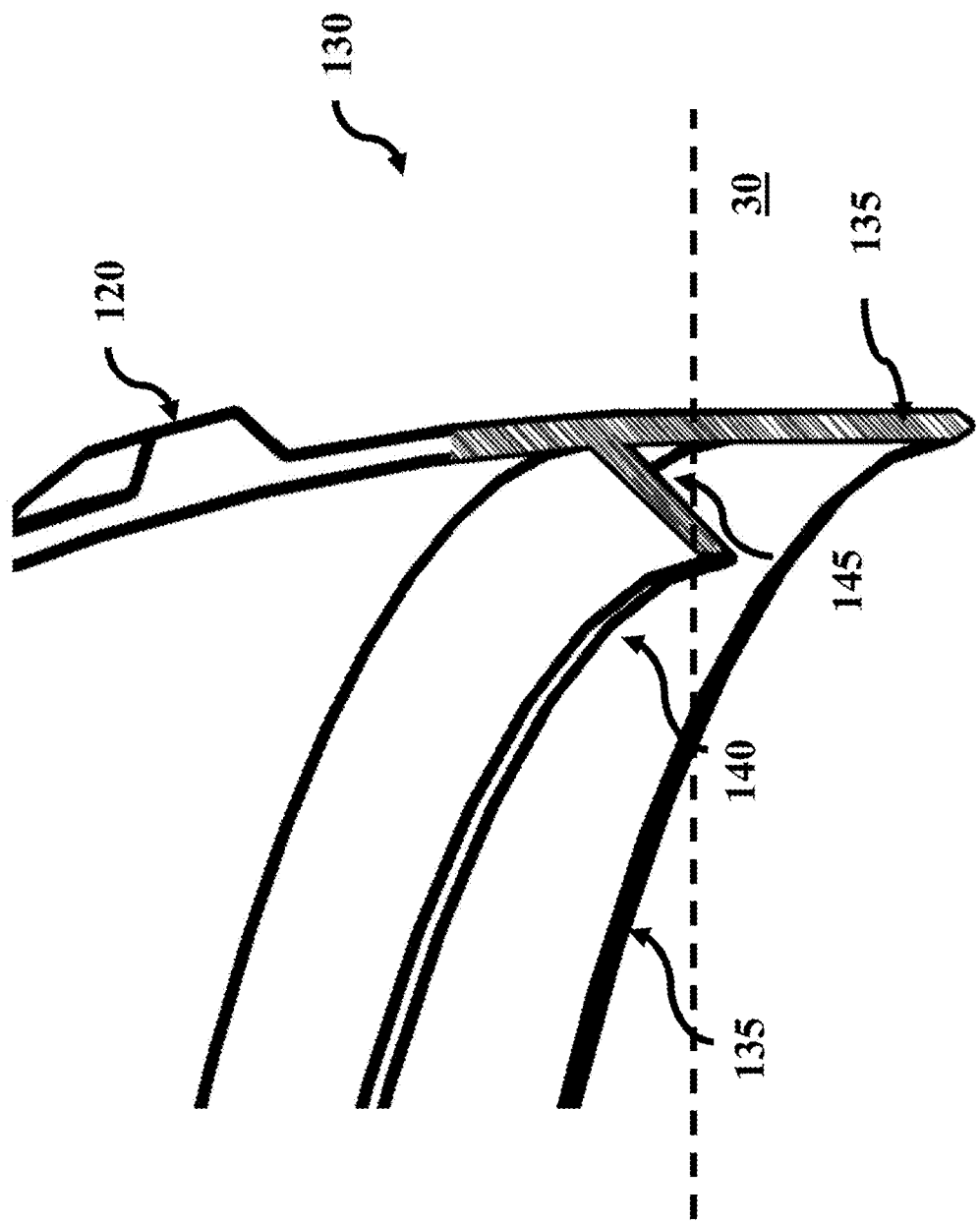
FIG. 5 is a close-up view of Circle II of FIG. 3A, illustrating an exemplary sealing system.

FIG. 5 is a close-up view of Circle II in FIG. 3 highlighting an exemplary sealing system 130 between the regolith 30 surface and the collection manifold 60 that prevents or minimizes the gases from the central region of the collection manifold 60 from escaping underneath collection manifold 60 to the outside environment. In the example embodiment of FIG. 5, a primary seal 135 is an extension of the pressure dome that extends below the regolith to create a continuous barrier. Having a tapered or pointed tip helps the primary seal 135 have greater force to penetrate the ground easier when the dome is placed on the ground. The primary seal 135 may be made of the same material as the pressure dome 60 or a modified version thereof, or a different material altogether. For example, if the pressure dome is made of titanium, the primary seal 135 could be made of titanium or heat-treated hardened titanium. The lip of the primary seal can assist with ground penetration, so it may have features, for example, serrations, crenelations or pointed areas, to aid in penetration. It can also be constructed of a more acoustically conductive material to aid in vibracore seating of the seal, or a tougher material, to aid in penetration if a hammered approach is taken for ground penetration. The depth of the seal lip into the regolith is the primary sealing design feature. The sealing lip could also be made of a softer material, such as a ductile steel which would allow for deformation if it encounters a subsurface rock or obstacle. Deformation around the obstacle to create a seal without causing the entire assembly to get stuck could be a benefit in some situations. There could be openings on the lip for gas flow, to provide gas pressure to displace regolith during seal emplacement. This would reduce the required force for digging. The bottom of the seal may be hard and solid to aid in digging, with the sides of the embedded portion expandable balloons that may be filled with gas pressure to place more compaction stress on the surrounding regolith, the more compaction of the material the less gas permeable it will be.

As gas transfer through the upper regolith 30 can make the system sealing ineffective, a deep enough primary seal 135 penetration into the ground helps to minimize the gas transfer. A first example of primary seal 135 depth range is between 1.5 and 10 inches of penetration into the regolith. This range accounts for a large variety of surface variation including soft surface regolith. A second example of seal depth is between 2.5 and 5 inches of penetration into the regolith. This range is deep enough to minimize gas transfer in the regolith but does not waste excess energy by going down as far as 10 inches. Preliminary calculations and test data for gas transfer through regolith simulant show depth of penetration should be around 2.5 inches for thruster pulsing operations occurring at 1 psi dome pressure.

For the above and some sealing system embodiments, a vibration drill process similar to the American Vibracore Services® core sampling process can help to bury the sub-regolith portion of the seal more easily with relatively low energy and low downward force. Additionally or alternatively to using the vibracore process, one can pound or hammer the dome groundward. That would take more energy but put less vibration into the system and compact the regolith around the seal, making it more gas flow resistant.

Additionally or alternatively, some embodiments have a secondary sealing lip 140 protruding in a downward direction out from the collection manifold 60 at a point near ground level when the dome is installed. The secondary sealing lip protrudes into the ground along the circumference of the dome and creates in gap 145 a tortuous path for the vapors to escape below the secondary sealing lip through the upper regolith from out underneath the dome. This is a labyrinth seal-type effect. The secondary sealing lip does not need to penetrate deeply into the regolith, but it prevents gas flow from escaping down the inner dome face to the primary seal and causing a failure. Additionally the secondary sealing lip may be angled or changed in size to aid in circulating gas flow in the dome. It may be shaped so that regolith collects onto it, thereby adding more mass to the primary seal and more regolith to impede gas flow. There may be more than one secondary seal, like a labyrinth seal they can be more effective when staged in groups of 3 or more. The secondary sealing lip 135 effectively lowers the need for the primary seal 135 to work by limiting the vapors reaching the primary seal, increasing overall sealing efficiency. It also slows the airflow across the primary seal 135. The secondary sealing lip 135 can also add localized pressure to the regolith decreasing the voids therein, reducing gas transfer in the regolith. This example sealing system also allows the pressure dome to keep digging into the ground under its own wright if frozen ground beneath it melts (somewhat evenly), with the seal remaining effective in some embodiments.

In regard to creating an effective seal, dome pressure can cycle up and down in range by changing the pulse rate of the thruster and the downstream pressure of the cold trap, x time on and 2-5x time off for pressure recovery and to prevent the gas from seeping through the regolith and escaping under the dome. Initial on time (x) for testing will be 1 second. This delay between thruster pulses prevents a steady state buildup of gas pressure in the regolith subsurface, thereby simplifying the complexity and depth required for the lip seal. A deeper lip seal or a greater distance from the crater may allow for higher system pressure or for the thruster to pulse for longer durations per cycle. Initial system pressure is established by firing the thruster.

Not shown are other potential additional or alternative seals between the regolith 30 surface and the collection manifold 60 that prevent the gases and the manifold from leaking out. In some embodiments, a seal can be added material that can withstand high temperatures and pressure within the manifold and the low temperatures and pressure outside the manifold. Alternatively, the seal can be formed through surface contact of the manifold with the ground with the addition of an external downward force on the collection manifold 60. Alternatively, when the dome does not need to be transported by spacecraft, the dome could be made of a large enough size and a heavy enough material such that its weight can self-seal, provided the ground is flat or compressible. Here the exemplary seal is the absence of a seal. Additionally, the heat from within the collection manifold 60 or extending from hot gasses 85 may cause some localized melting of regolith near the seal area to decrease voids, increase smoothness in the regolith and partially liquify some regolith, effecting a better seal. Additionally or alternatively, a removable adhesive or a cement seal could seal the pressure dome to the ground, and then can be lifted afterwards with minimal damage to the pressure dome. Additionally or alternatively, the sealing system can be made of a gasket with material that expands to fill context surface irregularities when heated. Or it can be a gasket of a compressible material such that with a heavy enough pressure dome or a downward force applied to the top of the pressure down to ensure enough compression to create the seal. Another exemplary seal is achieved using a temporary glassification of at least the top layer of regolith or a surface/pressure dome weld to achieve the seal. A different exemplary seal is achieved using an adhesive that can withstand high temperatures and pressures the seal is exposed to by the mining process. Multiple sealing systems and/or sealing mechanisms can be used together.

If the seal is broken, the volatiles would escape due to the high pressure and the temperatures present below the downward pressure. The dome can be secured against the ground by, for example, stakes, mass of the rover or lander, drilled-in anchors, or spring-backed tension on the vessel mount.

Removing the pressure dome from the ground to disengage it could be accomplished with a linear actuator on a rover. Additionally or alternatively, if the pressure dome is relatively stuck in the ground, pulsing the thruster to a slightly higher pressure than normal will help disengage it.

For efficiency, in a sealed system, any pressure regulation can be managed by the vents. However, the seals may be imperfect and still work. An undesirable flow rate out of the collection manifold could be offset by increasing engine output, adjusting the pulsing time, and utilizing less of the vent (a dome exit) within the vapor manifold.

A discussion of the rocket engine, nozzle type, propellant and operations follows. A "rocket engine," as used herein, is to be construed as a rocket-style engine with a combustion chamber and a throat. The nomenclature does not mean the rocket engine must be connected with a rocket. Often the rocket engine will have a nozzle. A type of rocket engine called a thruster can be useful here. A plume-based jet engine that can create a standing shock wave can work as well if performing rocket mining on a body with an atmosphere (e.g., Earth, Mars, Titan). Optionally, the shock wave front can cycle up and down through a range to add an additional disruptive force into the regolith. This option can be achieved by adjusting the engine thrust via throttling. Almost any plume-generating engine could work if the system were designed around the engine. This will be referred to as a rocket engine, even if the engine is used with a terrestrial jet The engine plume could have a significant excavation rate while contributing chemical energy and heating to the site. A small rocket thruster with low maintenance needs would assist as part of a sustainable platform without much, if any, human or robotic intervention. Additional non-limiting examples of engines selected from Masten Space Systems are the Broadsword™, the Cutlass™, the Katana™, and Machete™ engines. The optimal embodiment of a Masten engine would be the thrusters in the 10-100 lbf thrust range running on gaseous oxygen and hydrogen because the exhaust product is water, which can be reclaimed by the cold trap system and recycled for additional runs.

Regarding nozzle type, many exemplary embodiments can use a bell-shaped nozzle with the rocket engine because they create standing shock waves. Potentially, other nozzles besides bell-shaped nozzles could work if they can concentrate energy, and potentially a shock wave, to work effectively in this application. One such option might be the aerospike design.

An exemplary nozzle may be fixed in place relative to the collection manifold. Another exemplary nozzle may be movable within the collection manifold. For example, electric linear actuators may deflect the engine based on computer inputs, altering that direction of the nozzle and its outputted plume. If the pressure dome is large enough and sealed in a way to allow the movement of the nozzle to address a broader plume impingement area beneath the pressure dome, the ability to raster the nozzle across the surface may allow a larger area under the dome to be mined without moving the dome. This enables increased efficiency, given that a seal needs to be created each time the pressure dome is used on the surface. The sealing system for a movable nozzle needs to have flexibility and maintain the seal around the nozzle/pressure down interface and around the pressure down/surface interface despite the movement of the nozzle. Care must be taken not to erode the surface under the seal. Additionally or alternatively, the nozzle can translate up and down within the collection manifold.

When propellant, also known as fuel, is combusted within the rocket engine, a plume extends out from the rocket, typically exiting through a nozzle. Various types of fuels and propellants can be used. An example engine is a pressure-fed LOX/IPA propellant that is regeneratively cooled. Many common present and future propellant types could work, including methane/LOX, NTO/MMH bipropellant, MXP-351® propellant, hypergolic bipropellants, nitrogen tetroxide (NTO) or monomethyl hydrazine. While not required to combust the rocket engine in the embodiments herein, it may be beneficial to use a propellant where unspent propellant or propellant exhaust can be fed and processed through the collection system, thereby increasing efficiency and decreasing environmental cost. For example, a propellant with an exhaust comprising water molecules would further feed into the production of water vapor that can be condensed into water. Two propellant types that fit that description are oxygen/hydrogen bipropellant or high-test hydrogen peroxide monopropellant through a catalyst. This creates a more efficient water mining system, and the propellant choice would not affect the potability of the water. Both types can be generated from water, with oxygen/hydrogen through electrolysis as the preferred solution. Hydrogen peroxide may be made from water through a reverse fuel cell process.

A more efficient excavation option is a rocket engine system producing a shockwave in addition to the heat of the plume is desirable. The rocket engine choice and thrust must consider, among other things, the forces required to remove the collection manifold from the ground, the rocket engine from the collection manifold, and pressures in the system. Some embodiments are built around an engine that uses 100 lbf of thrust.

A circular or other shaped opening at the top of the collection manifold may be attached to or sealed to the rocket or nozzle. A flexible seal enables movement of the nozzle relative to a fixed collection manifold. Some maneuverability of the plume location and direction is not required but could be beneficial. Known or future created engine gimbal systems can help the engine nozzle pivot or translate within the collection manifold, as shown but not limited by FIG. 3A, giving the operator an opportunity to penetrate a larger volume.

In the example methods, the plume is directed to, at, or through the ground to heat a frozen volatile source. The frozen volatile source could be a surface or subsurface source. The terms "surface," "ground" and "regolith" can be used interchangeably in this application unless the context suggests otherwise. Ground can mean rock, soil, regolith, frozen layers or sediment horizons of water or volatiles, mixed regolith and frozen volatiles, or any other materials one of ordinary skill in the art would consider the ground or combinations thereof. If a crater does not exist, the plume can be used to crater or deep crater the ground. The deep cratering is created by adding pressure to the collection manifold so that a standing Shockwave created in the engine is given conditions not to dissipate. As a result, the deep cratering effects can be controlled by tuning the pressures in the manifold. In addition to applying heat, the ground can also be churned using the plume containing the standing shockwave.

The plume pointing direction is, generally speaking, toward the ground; it need not be perpendicular to the surface. The rocket engine's forceful and directional application of heat and shock waves provides the ability to deep crater and churn through the regolith. The ability to maneuver the rocket engine in different directions to cover more area allows a quicker and cheaper extraction of frozen volatiles. This could be terrestrial mounting systems or gimbal systems designed to control rockets in flight such as those used on Masten's Xodiac™ rocket. All of this nozzle maneuvering should be done within the confines of the sealing system between the collection manifold and the rocket engine. (The control mechanisms can optionally sit outside the collection manifold.)

Operation of the thruster not perpendicular to the surface, and with an unsealed or lifted dome, would allow scouring and blowing away of dry regolith overburden to make access to volatile containing deposits easier.

The rocket engine can be run continuously, adjusting the thrust or pulsing it to achieve the desired pressure and heat conditions in the collection manifold. To lower the pressure while still operating the engine, the engine output is reduced in the form of longer timing between pulses, shorter pulse duration, and/or lower thrust. Conversely, to increase the pressure, increasing the thrust, decreasing the timing between the pulses, and/or increasing the pulse duration will increase the pressure in the system.

The design of the sealing system between the rocket engine and the collection manifold must consider the heat and pressures that the seal will be subjected to. A flexible seal system allows more movement of the nozzle angle $\theta_N$ to increase efficient extraction of the frozen volatiles from underneath the manifold footprint in the ground. The manifold footprint may potentially be larger than the manifold itself because of the plume impingement point within the manifold. In this way, the plume impingement point can raster through much of the manifold footprint and reach beyond the manifold exterior at lower depths, provided the volatiles have no other exit paths beyond the intended paths.

The operator can take advantage of deep cratering in multiple points and at multiple nozzle angles $\theta_N$ by adjusting the pressures and focusing on a specific point to get greater penetration than otherwise possible.

Now that the rocket and its operations have been discussed, a discussion of the dust prevention and removal system embodiments follows.

To minimize particulate matter including regolith soil, dust, and other particles (collectively "dust") contamination in the system, prevention or cleaning mechanisms can be added into the system.

In some embodiments, one such prevention mechanism is a deflection plate 65, as shown in FIG. 4, that creates a tight fit blocking the volatile collectors and leaving a narrow nearly circumferential volatile channel 75 that directionally blocks the vector of particulate matter from the plume penetration site to the volatile collector 70—an exemplary vector is shown with dashed arrows in FIG. 4. In accordance with the directions of the solid hollow arrows in FIG. 4, the channel allows the volatiles to escape to the volatile collectors 70 to the vapor manifold 80 while the deflection plate discourages dust from escaping the dome and making it to the cold plate. By the channel 75 facing downward instead of upward, it eliminates falling dust from landing in the channel 75.

A gravity separator system can assist in removing the dust from the volatile flow stream. This system can empty the traps and keep itself from getting clogged by, e.g., a reverse blow back into the dome or something as part of a cleaning operation after mining out a section. If a volatile or liquid is used for this operation, it would preferably be an undesirable byproduct of the operation.

Preventing accumulation of regolith dust into the cold plate condensation system aids the sustainability of the system without maintenance intervention. This can be done in one or more ways including multilayer screens, careful valve choice, automated rinsing systems, dust airflow component design, and automated plate wiping systems. One approach could use filters built into the flow path using Masten's PermiAM™ additive manufacturing technology, which creates pore spaces small enough for gas to easily flow through but provides a tortuous path for particulates, preventing them from passing through. One approach would use a gravity separator mechanism to remove the dust using lunar gravity. This could be a long run with collection bins in the floor or a swirler type setup if additional gas is injected into the system.

Now a discussion of what happens downstream from the collection manifold will take place including the condenser, storage tank, and potential for gaseous oxygen and hydrogen preparation.

Figure 6:
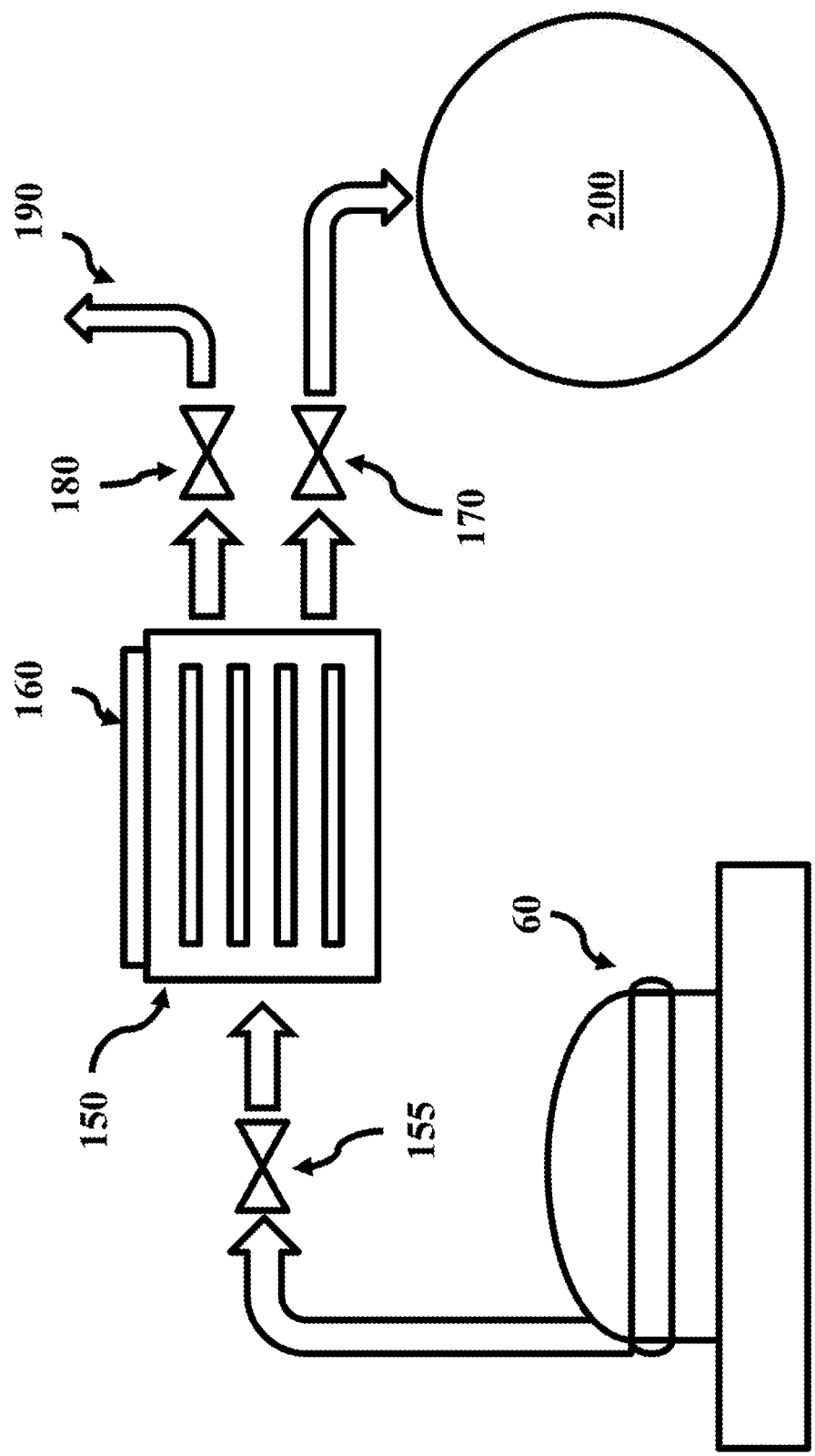
FIG. 6 is a component view of an example complete rocket mining system embodiment.

FIG. 6 illustrates an example embodiment with the volatile transfer throughout the mining system. From the dome exit 110, the volatiles approached check valve 155, which allows flow one way to the cold trap and allows control of the pressures within the central area. After reaching the check valve, the volatiles 90 reach the cold trap 150 having internal cold plates or surfaces. A space facing radiator 160 facilitates the cold transfer from the outside environment to the cold surfaces. On or near these cold surfaces, at least some of the volatiles 90 condense. Control valve 170 captures the water coming out of the cold trap 150 and diverts it to a water storage tank 200. Control valve 180 captures non-condensed volatiles 90 from the cold trap 150 and vents them to the environment. The check and control valves may be remotely monitored and manipulated to optimize the pressure and operations of the mining system. Along this path that has been described, volatiles can be extracted out of frozen volatile sources in the ground and then condensed and stored for use on the moon and future space missions.

Regulation of the pressures in the system facilitate various processes in the system. The valves on the system exit provide control of the pressures to optimize excavation and condensation while not over-pressurizing the system. Managing the pressure near the cold trap or condenser affects the condensation rate of the volatile. Greater pressure in the condenser yields greater condensing efficiency. And the collection manifold pressure will be higher than the condenser pressure to force the flow of volatiles through the mining system.

An optional embodiment is for the cold trap to be integrated with the collection manifold. One such option is equipping the interior of the vapor manifold with cold plates for condensation, where the warm side of the plates will be inner-facing towards the vapor manifold and the outer-facing (space-facing) side is the cold side. The volatiles would pass over the warm side to condense and then drip via lunar gravity into a collection tank. This system would be thermally managed to control the temperatures.

Figure 7:
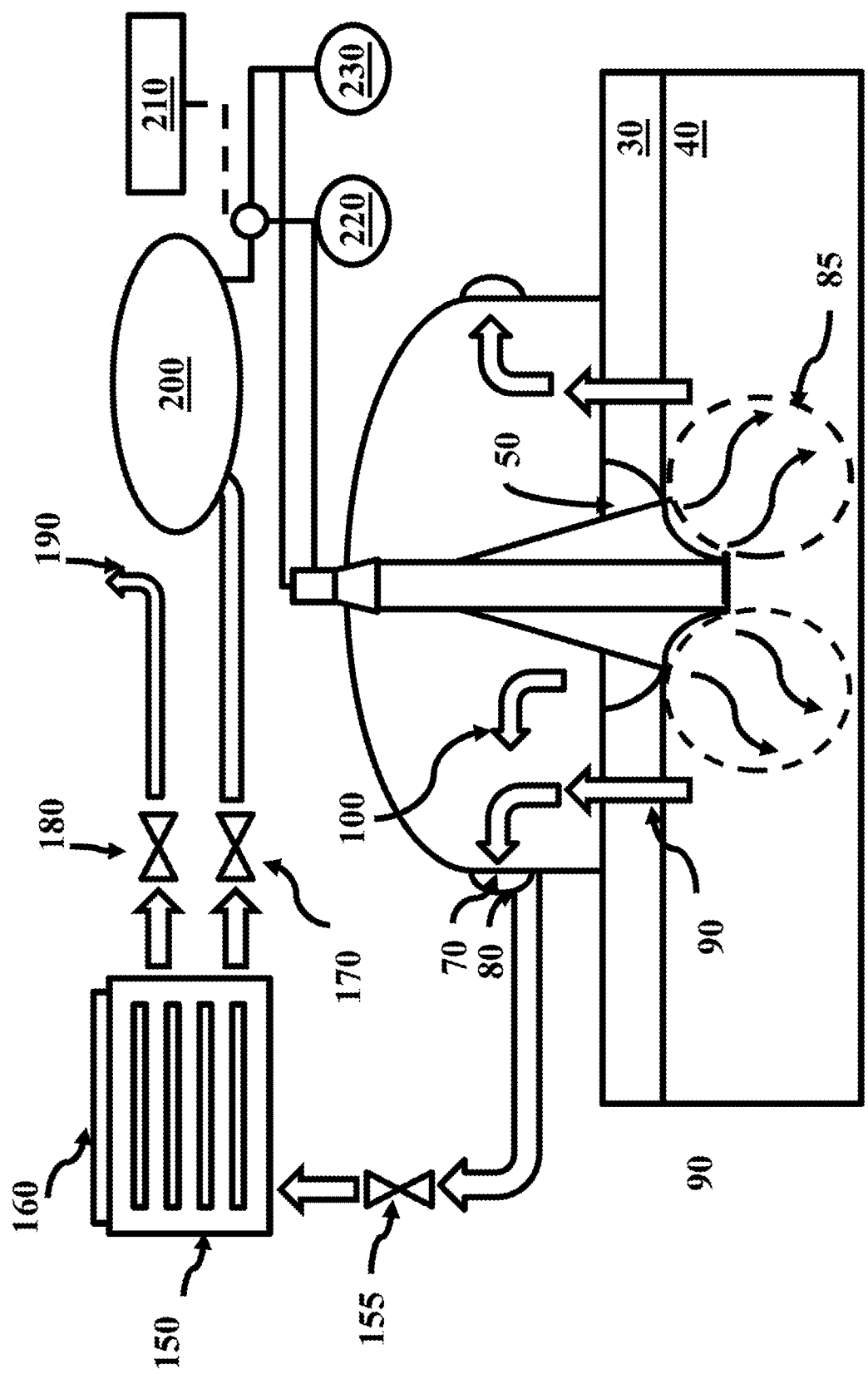
FIG. 7 is a component view of an example complete rocket mining system embodiment having a material feedback loop where the mined volatiles are used to power the rocket engine, which powers the mining operation.

FIG. 7 illustrates an example embodiment similar to that of FIG. 6, except that this system generates rocket fuel that then powers the rocket to continue mining in a closed loop fashion. Here, the water from the storage tank is electrolysed into gaseous hydrogen and gaseous oxygen using electricity from a solar panel 210. This gaseous hydrogen and gaseous oxygen are then stored as rocket propellant 220, 230. The propellant is then combusted in the rocket engine to power the plume in a self-powering virtuous cycle. As previously mentioned, when the rocket engine exhaust is made of water, that water further assists in building efficiency during water harvesting from the frozen volatile sources. Such a system can continue to operate for long periods of time, as long as the system is designed with low maintenance requirements.

Figure 8:
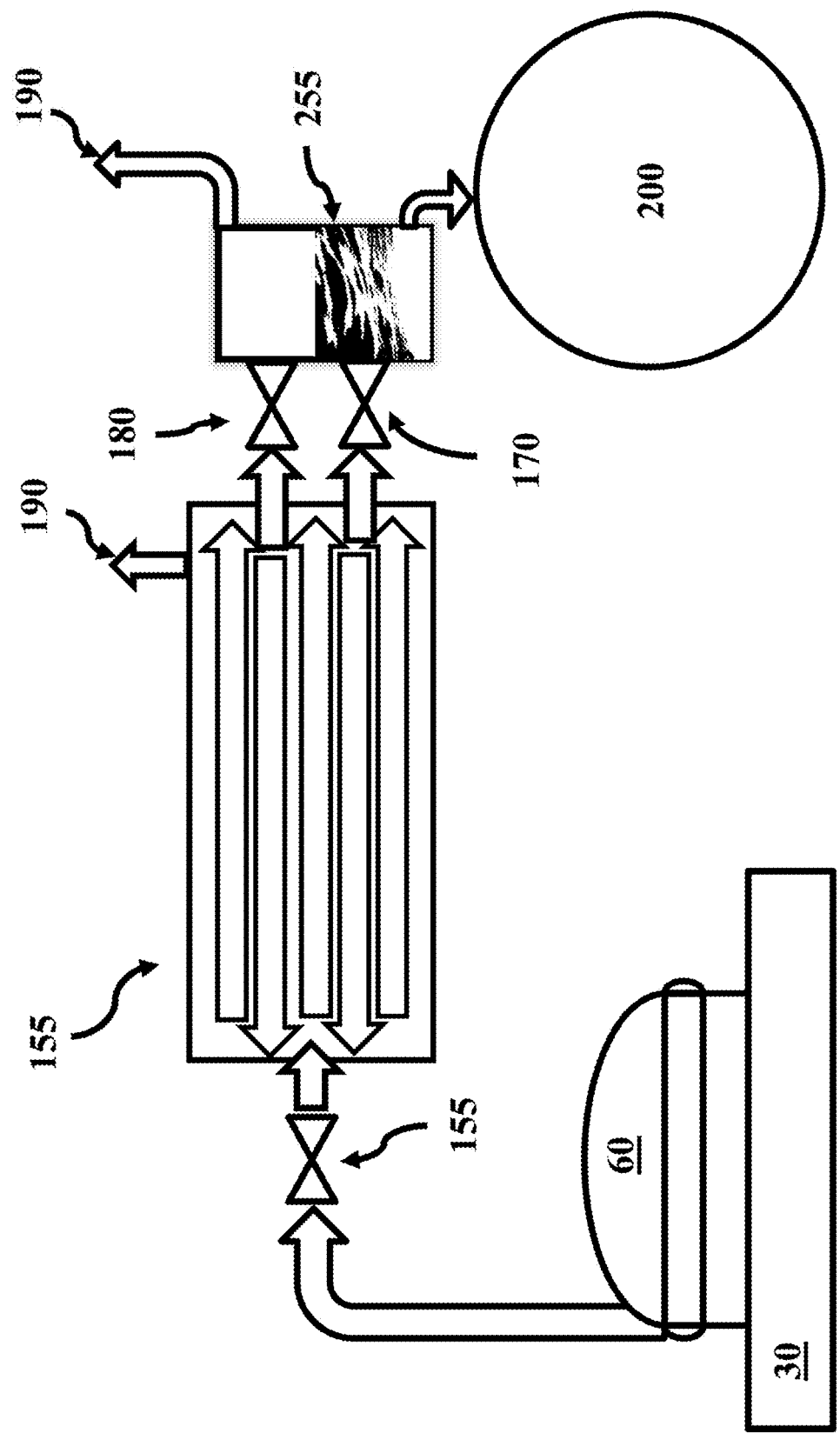
FIG. 8 is a component view of an example complete rocket mining embodiment using a heat exchanger cold trap.

FIG. 8 illustrates an example embodiment to that of FIG. 6, except that this embodiment uses a heat exchanger cold trap 155 as the condenser instead of a cold plate based cold trap. Additionally, there is an extra vent 190 to the outside environment to allow outgassing at the heat exchanger stage. Similar to FIG. 6, control valve 170 and control valve 180 control the flows to material separation tank 255. Control valve 180 may control the same gas as may be vented out in the heat exchanger vent 190 or it may control the same liquid as passes through control valve 170, or it may draw off liquid of a different density than the liquid passing through control valve 170. In material separation tank 255, liquids and gases, or liquids of different densities, can be further separated. Then at least one liquid is sent to storage tank 200. Additional volatiles can be vented out of the material separation tank 255 through vent 190.

In this application, the terms "manifold," "collection manifold," and "pressure dome" should be construed identically. The first exemplary pressure dome is a relatively static structure that can withstand temperatures and pressures. The material needs of the pressure dome will depend on the intended use of the mining system, the expected temperatures, pressures, relocation needs, and durations of operations. An example material that would work well in a one-off static system could be an iron dome. The downside is that such a dome would be very heavy. For a space-transported application, an example titanium-based dome is a higher expense but much lighter saving on space transport costs. An upside is the weight of the collection manifold and rocket engine create the seal by compressing the soil. This requires a very strong material, preferably with high fracture toughness. The second exemplary pressure dome is a lighter weight, ballooning-type structure that can expand under the temperature in pressures under the dome without rupturing.

To maximize the sustainability and efficiency of the system, the combusted propellant and any other gases, liquids or solids introduced into the pressure dome through the nozzle will be handled like any other volatiles and routed through the mining system. For example, a propellant whose exhaust is water vapor can contribute water to a water mining rocket system. In addition, the mined water can be used to create additional propellant, which can operate the system on a continuous cycle fueling more combustion and mining more water.

The system may release pressure from under the pressure dome or downstream by venting gases into the atmosphere or space, depending on the environment. It is also possible to have one or more solid particle exits such as tailings pipes at various points in the system or on the rover to dispose of unwanted solid particles. These solid particle exits can be combined with the gas vents.

Collecting volatiles released from the soil is one of the goals of this application. This is done through volatile collectors. The first exemplary volatile collector is a pressure relief valve that allows the passage of pressurized gas, provided such pressure is higher than the pressure designed into the relief valve. The second example of a volatile collector could be a computerized one-way valve. A completely optimized system within a computerized valve may be able to go without a volatile collector or vapor manifold. That is, the nozzle can be controlled, and the pressure dome could vent to a later one-way valve that controls access to the cold trap.

The pressure dome may also have sensors for measuring the temperature and pressure within the dome, and at a subsurface level, e.g., a pressure transducer can be located in the primary seal 135. By looking at the difference of a sensor reading from a pressure transducer located within the collection manifold's central area and a sensor reading from a pressure transducer located subsurface in the regolith in a pressure control loop, unsafe conditions can be determined. Such a rise in subsurface pressure can cause a logic in the master control system to shut the engine off as a precaution to prevent gas or volatiles from escaping out from under the collection manifold. That detection could point to, for example, failure of soil structures or bed fluidization.

The condenser cools the volatiles into a liquid. One embodiment uses cold plates or cryogenic technology to condense the volatiles. The cold plate operates by flowing the volatiles across cold surfaces to cause the volatiles to condense. As shown in FIG. 6, several surfaces or "plates" can be placed in close proximity in the cool trap 150 to rapidly cool a large volume of volatiles. Another embodiment benefits from cold exterior temperatures and utilizes a long length of piping to heat exchange from the cold piping to the volume of volatiles until the volatiles condense. As mentioned above, the embodiment depicted in FIG. 8 uses a heat exchanger design to exchange heat and the piping containing the volatiles with another source that may be colder to bring the temperature of the volatiles down faster. For example, at the end of the process, liquid water that has been excavated from the frozen volatiles source and then condensed into water can be used to cool upstream hot volatiles through a heat exchanger setup. Different cold plates can be tuned to different temperatures to preferentially condense certain volatiles on certain plates; this aids in separation of the water from other impurities.

Figure 10:
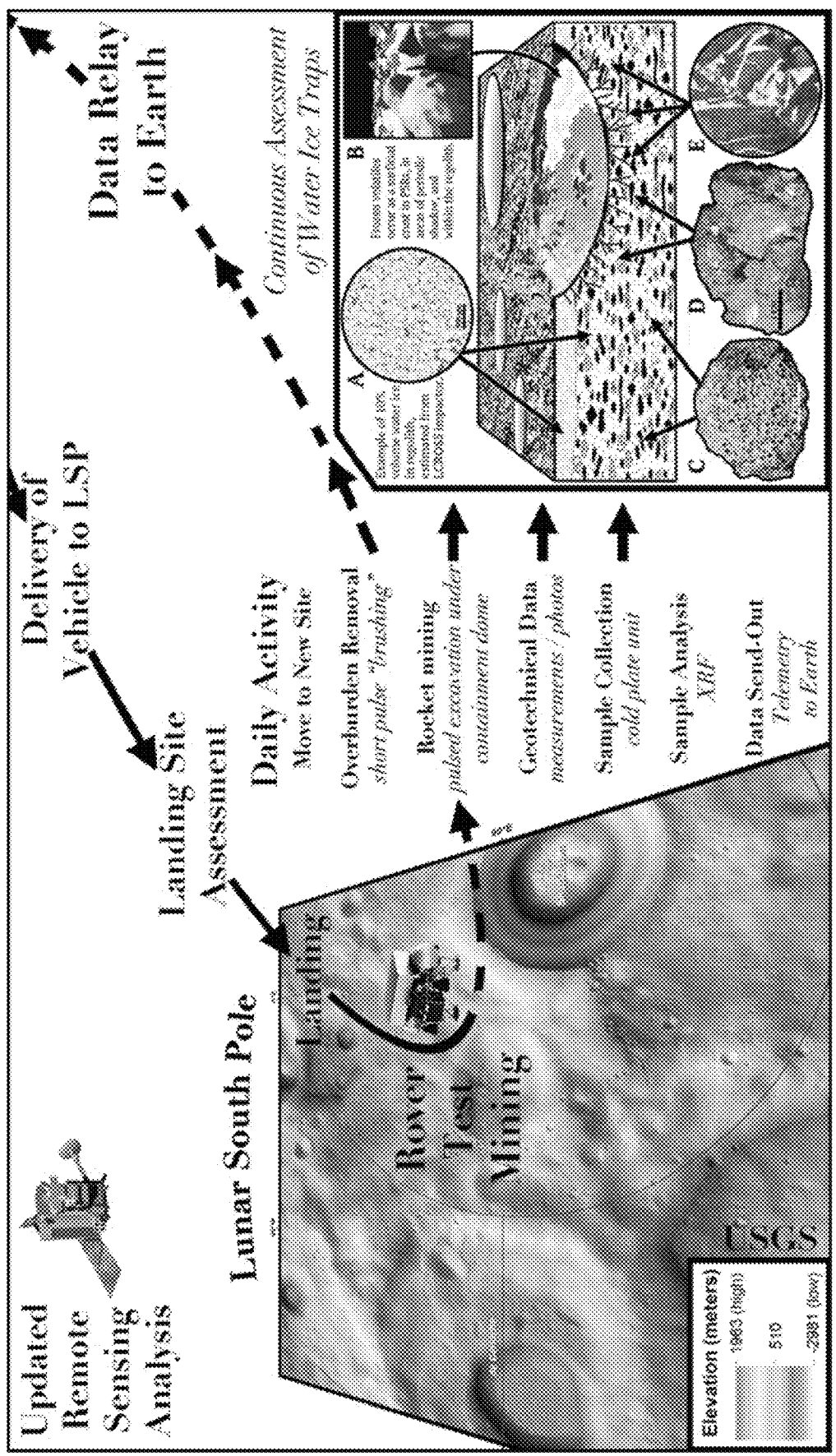
FIG. 10 is an infographic illustrating the system loop of a rover going back and forth between mining sites, mining and sampling there, and then sending telemetry-based data back to Earth.
Figure 12:
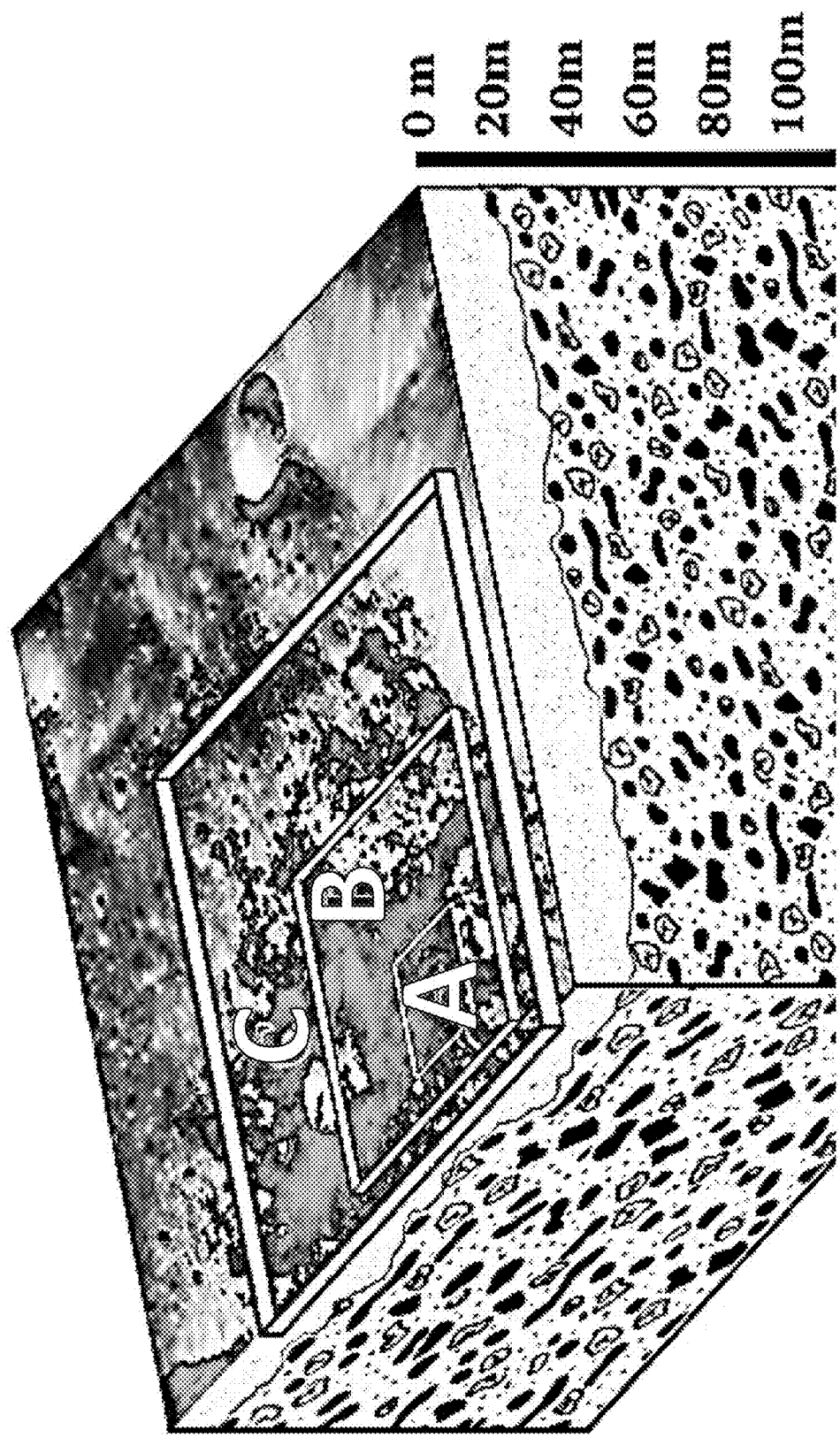
FIG. 12 is a 3D map of the lunar regolith environment showing how zones A, B, C have different amounts of ice present.

FIG. 10 is an infographic that describes the example mining operation broadly, and shows how a specific cross-section of regular and areas of the lunar landscape may have significant amounts of water ice, up to 10% by volume, as estimated from a LCROSS impactor. Frozen volatiles occur as the surficial crust in Permanently Shadowed Regions (PSRs), in areas of periodic shadow, and within the regolith. This variation in lunar landscape water content is further shown in FIG. 12, where area A should have a higher percentage of water content than that of area B and area B should have a higher water content than that of area C. As shown by the distance scale in FIG. 12, regolith is found, on average, in the first 20 m of depth with megaregolith found, on average, from 20 m down, but this amount varies throughout the landscape. Applicant's solutions can help access subsurface frozen volatile sources quickly and in an economic manner for the top regolith layer at small- to medium-scale implementation, and using very large assemblies could access frozen volatiles in the megaregolith layers. A benefit of the rocket mining approach is that if there are large rocks in the regolith layer, they can be easily bypassed and mined around as the gas seeks a path around rocks. This is unlike a drill approach which may break, fail or run into difficulties if it encounters unexpected rocks or sediment types for which it is not designed. (For example, see the Mole payload on the Mars InSight mission.)

Figure 11:
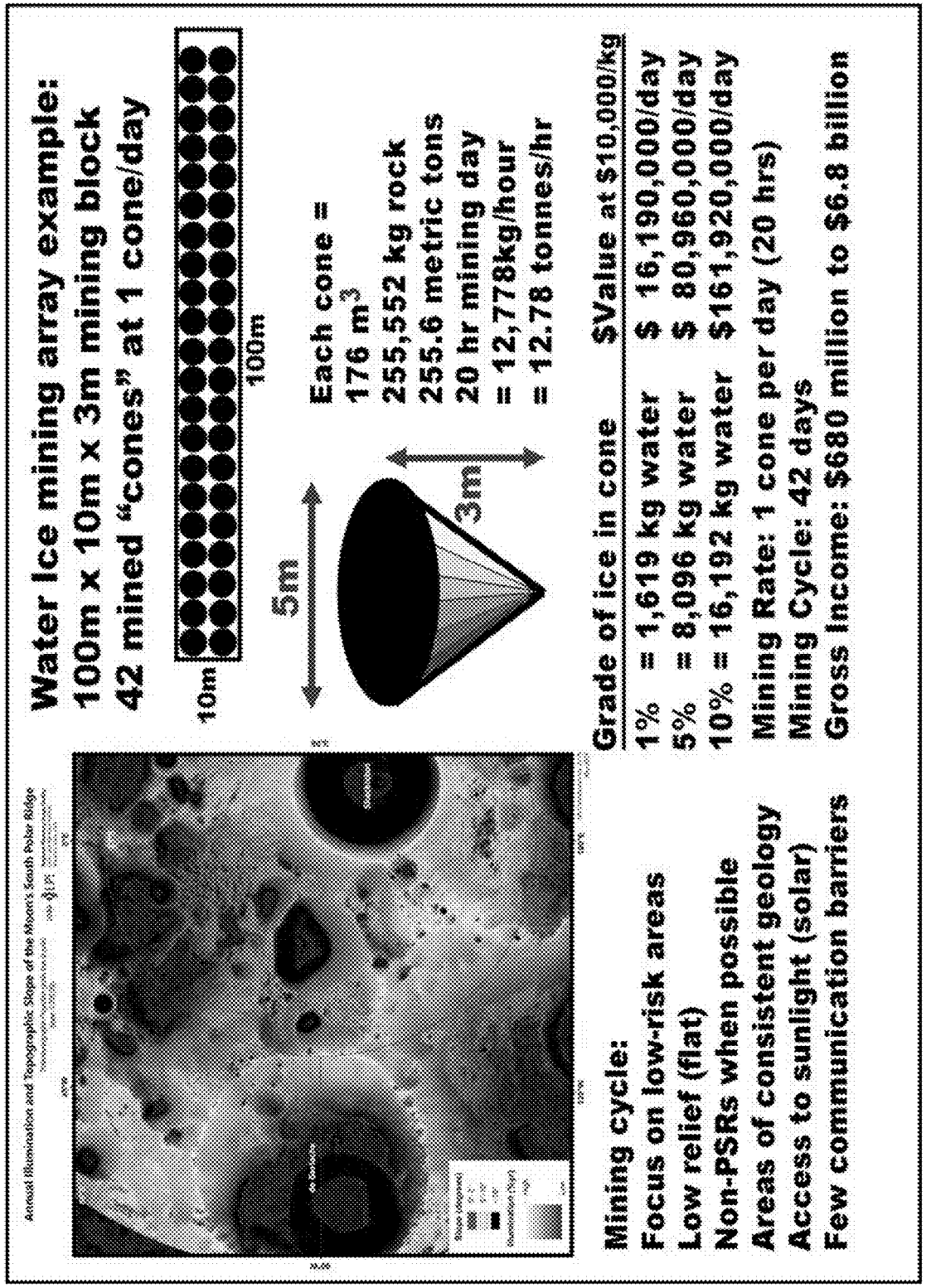
FIG. 11 is an infographic showing mining pit configurations including a calculation showing the amount of water recovery and the commercial value of that water in a lunar environment.

FIG. 11 illustrates an infographic highlighting the mining and economic efficiencies of some exemplary method embodiments. Given the absence of readily available water sources on places like the Moon, water has a tremendous economic value. Applicant's example system can mine, for example, 42 m by 5 m by 3 m pits=crater=cones from a 100 m×10 m×3 m mining block at a rate of one pit per day with a 20-hour working day. Depending on the grade of ice in the mined crater-cones, the economic value of the mined water can be significant in a relatively short period of time, particularly if high-grade extraction locations can be located and mined.

FIG. 11 also highlights that, ideally in the mining cycle, an area proximate to sunlight for ready access to an energy source, and an area where communication is possible can be some of the ingredients for a successful mining operation. Additionally, choosing flat areas of consistent geology and non-PSRs can help keep operations simple and efficient.

As discussed above, the pressure and temperature in the system can be manipulated, among other ways, by altering the thrust, the pulse length, or the period between pulses. In the event that too much pressure accumulates in the collection manifold, it could affect the seal or stability of the collection manifold. The pressure could be vented, but that risks losing some of the volatiles. Controlling the rocket engine as discussed above to lower the pressure in the system could bring the pressure back down to safe levels. Alternatively, if it is sensed that a pressure drop has occurred in the regolith measured through a subsurface pressure transducer, something is likely wrong such as the seal at the base of the dome, a failure of soil structures, and/or bed fluidization and the engine could be turned off The churned regolith, post mining, can be collected and undergo additional processing. Oxygen may be extracted through chemical reduction or other processes through the application of energy to the regolith or the mined water. Additionally or alternatively, the churned regolith could be sintered into building material or mixed with a binder to form building material. This building material may be useful for building additional pressure domes or as a construction material for buildings, landing pads, and roads on manned lunar bases.

Figure 9:
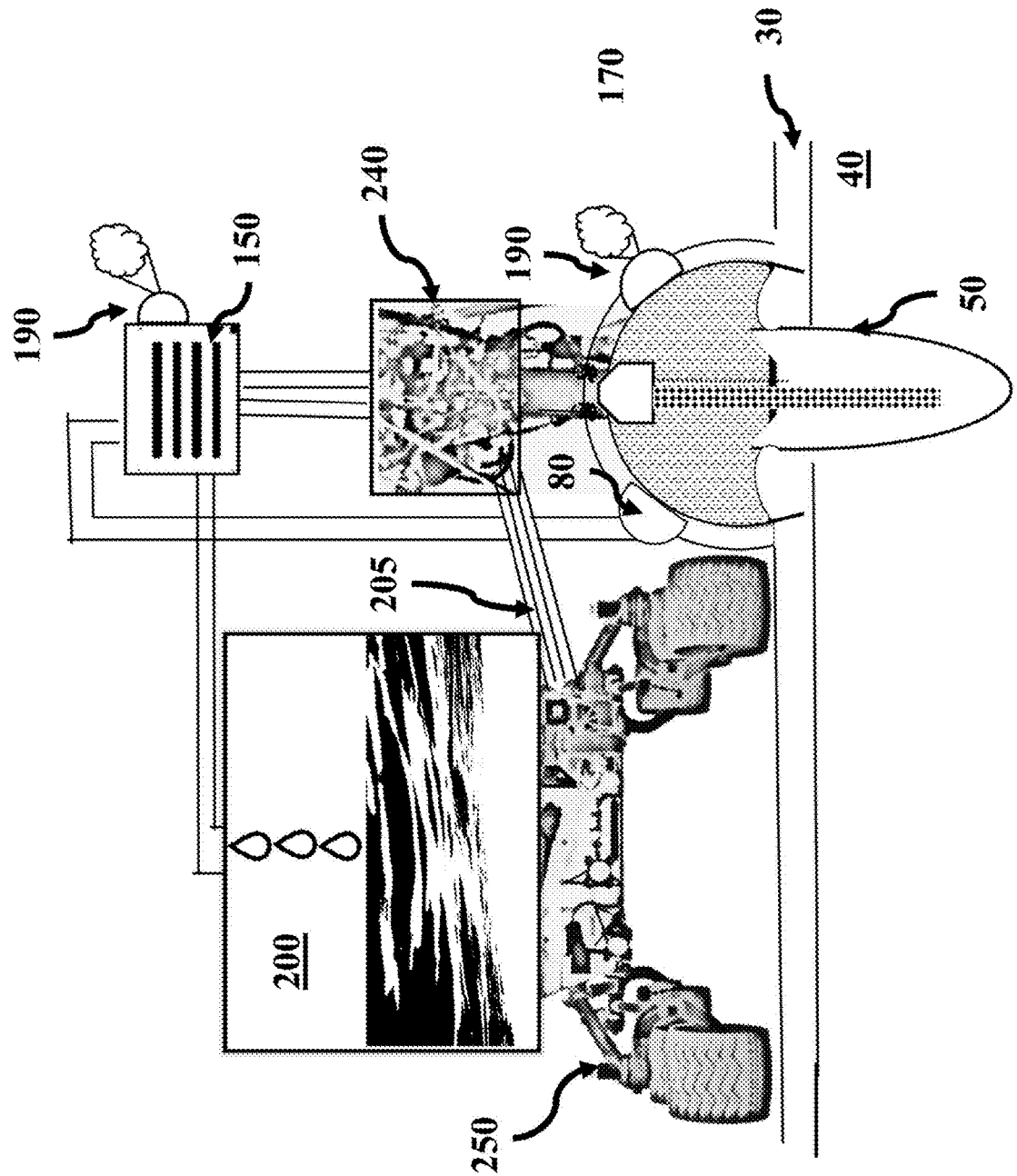
FIG. 9 is a component view of an example complete rocket mining rover embodiment.

The ability to mine water rapidly enables the system to be integrated into a mobile rover. FIG. 9 depicts a component level view of an example rover embodiment. This rover 250 shares many features with the embodiment depicted in FIG. 6. Additionally, the rover 250 itself has wheels, tracks, legs, or the equivalent for transporting the mining system to and from different locations. It also has a support and control arm 205 that can raise and lower and manipulate engine Gimbal machinery 180, collection manifold 60 and cold trap 150. After the water is condensed, it can be stored in storage tank 200. This drawing is not to scale, and there can be many different configurations here. In addition, similar to the embodiment of FIG. 7, the water can be electrolysed using electricity to break into gaseous hydrogen and oxygen to formulate propellant for continued rocket engine combustion. A rover can seek out areas of high-water concentration, and also transit to sunlit regions over the entire lunar year for solar energy for charging the rover, collecting solar energy for electrolysing the water, for long-term water storage near a solar energy fuel source for the rover. The embodiment of a rover-based mining system can mine different locations and store the mined liquids or solids or even volatiles on board and transport them to a more permanent storage site. This can all be automated and/or machine controlled. Such a system can be programmed to run autonomously and may additionally benefit from artificial intelligence or machine learning for geo fencing/positioning and finding the locations of frozen volatile sources. Additionally or alternatively, the robotic rover can be remotely controlled through a wireless communications system.

It will be apparent to those skilled in the art that various modifications and variation can be made to the disclosed methods, systems, software, hardware, materials, and components herein. Other embodiments will be apparent to those skilled in the art from consideration of the specification and practice of the disclosed inventions. Numerous modifications, changes, variations, substitutions, and equivalents will occur to those skilled in the art without departing from the spirit and scope of the claimed invention. It is intended that the specification and examples be considered as exemplary only, with a true scope being indicated by the claims, as later amended, and their equivalents. The benefits, advantages, solutions to problems, and any element(s) that may cause any benefit, advantage, or solution to occur or become more pronounced are not to be construed as a critical, required, or essential features or elements of any or all the claim, unless asserted as such by Applicant's remarks in the record. Accordingly, the specification and figures are to be regarded in an illustrative rather than a restrictive sense, and all such modifications are intended to be included within the scope of the claimed invention. Likewise, it is to be understood that the phraseology and terminology employed herein are for the purpose of the description and should not be regarded as limiting.

Another benefit of the embodiments within is the system's limited ecological impact relative to some other mining technologies. The example combustion of $H_2$ propellant and $O_2$ oxidizer naturally combine into clean water. The collection manifold can help contain and minimize blown dust. The rover can be solar powered and battery operated. In certain example mining operations, as described above, the mined volatiles can be used to provide new propellant. And the process has less negative environmental impact than traditional drilling, cutting, fluids or chemical slurries used in mining.

Terms used interchangeably means that they are intended to be construed the same unless the context suggests otherwise. The terms "collection manifold," "pressure dome," "collection dome," and "dome" may be used interchangeably through this specification. The terms "regolith" and "soil" and "ground" may be used interchangeably through this specification. While directions are used in this specification with respect to a ground-based excavation example, it will be appreciated that the mining embodiments herein could refer to different angles of use (e.g., tunneling or rock boring at horizontal or upward angles). "Some embodiments" does not always refer to the same subset of embodiments, and subsequent recitations of "some embodiments" may refer to a different subset of embodiments. "Exemplary" and "example" when used as an adjective or adverb should be construed the same and mean one of many possible embodiments of the referenced type of embodiments. "Exemplary" is not to be construed as meaning important. Regarding additional interpretation and construction of terms and steps herein, method steps are not in any specified order unless dictated by the context or specific wording. In addition, one of the uses of a word in the singular form should be interpreted where the context allows, or does not restrict, so as to enable plurality or an "at least one" construction. Positional and directional terms described in this specification may be understood to be different than shown or described, and should not limit the variations of embodiments possible from the claimed features that a person of ordinary skill in the art would understand from the specification, figures and claims. "Groundward"means toward the ground, which may be down among other directions. The term "and/or" in a list means all list items present, some list items present, or one of the list items present, unless such construction is limited by the context. "Including" means including, but not limited to. It is also appreciated the dependencies from one independent claim or claims dependent therefore may be used together with similar systems or methods of use on other independent claims or claims dependent therefrom, and that such claim amendments would be directly supported.

INDUSTRIAL APPLICABILITY

In addition to the goals stated above, the system, apparatuses and methods herein can be used to mine frozen volatiles in terrestrial, lunar, asteroid and planetary environments.

Reference Numeral List
  Rocket Engine Nozzle 10
  Plume 20
  Regolith 30
  Frozen Regolith 40
  Crater 50
  Collection Manifold/Pressure Dome 60
Deflection Plate 65
  Volatile Collectors 70
Volatile Channel 75
  Vapor Manifold 80
  Hot Gases 85
  Released Volatiles 90
  Combusted Propellant 100
Abrasion-Resistant Surface 105
Dome Exit 110
Hyper Pressure Sleeve 115
Stiffening Rib 120
Sealing System 130
Primary Seal 135
Secondary Sealing Lip 140
Gap 145
Check Valve 155
Cold Trap 150
Heat Exchanger Cold Trap 155
Space Facing Radiator 160
Control Valve 170, 180
Vent to Space 190
Water Storage 200
Support and Control Arm 205
Solar Panel 210
Gaseous $H_2$ 220
Gaseous $O_2$ 230
Engine Gimbal Machinery 240 and Propellant Tank (Not Shown)
Rover 250
Material Separation Tank 255
Nozzle Angle $\theta_N$

The invention claimed is:

1. A method of mining frozen or trapped volatiles from a surface or subsurface source, the method comprising:
   combusting propellant within a rocket engine and creating a plume;
   aiming the plume into or through ground to heat a frozen volatile source within the ground or underground;
   capturing volatiles released from the heated frozen volatile source using a collection manifold surrounding a ground access point of the plume; and
   removing the volatiles from the collection manifold.

2. The method of claim 1, further comprising cold processing the volatiles in a condenser to condense the volatiles into liquid or solid form.

3. The method of claim 2, further comprising routing the volatiles away from the collection manifold by extracting the volatiles with a volatile trap connected to the collection manifold and piping to carry downstream the volatiles towards a processing plant including the condenser.

4. The method of claim 2, wherein the pressure in the collection manifold is higher than a pressure in the condenser.

5. The method of claim 1, wherein the step of combusting further comprises using the rocket engine to create a crater within the ground or churn the ground.

6. The method of claim 1, further comprising increasing a pressure in the collection manifold to provide a less diffuse plume.

7. The method of claim 6, wherein the pressure is increased at least until the plume collimates and forms standing shock waves.

8. The method of claim 1, further comprising a step of setting a thrust level of the rocket engine including
   sensing pressure with a pressure transducer mounted within the collection manifold, and
   adjusting a pulse rate or throttle of the rocket engine based on the sensed pressure from the pressure transducer.

9. The method of claim 1, further comprising lifting the collection manifold, positioning the collection manifold over a new volume of regolith to be mined, lowering the collection manifold over the new volume of regolith to be mined, and repeating at least the steps of combusting, capturing, removing and cold processing.

10. The method of claim 1, further comprising securing the collection manifold to the ground through applying groundward pressure using stakes, a mass of a rover or lander, drilled in anchors, or spring backed tension on a collection manifold mount.

11. The method of claim 1, further comprising maintaining a pressure in the collection manifold below a maximum safe pressure by measuring pressure inside the collection manifold using a pressure transducer on an interior wall of the collection manifold, and
   continuously adjusting a throttle level of the rocket engine or by pulsing the rocket engine in short pulses to decrease the pressure to maintain a specified safety factor of allowed pressure in the collection manifold.

12. The method of claim 1, wherein the step of combusting further comprises pulsing the rocket engine to break up the ground at a plume impingement point.

13. The method of claim 1, further comprising electrolysing water into hydrogen and oxygen and routing the hydrogen and the oxygen into respective storage tanks.

14. The method of claim 1, further comprising increasing a length or an excavation reach of the plume by at least one of increasing thrust of the rocket engine and increasing pressure within the collection manifold.

15. A collection manifold for capturing volatiles released by plume impingement, the collection manifold comprising:
- a collection manifold that defines an interior volume and is configured to disengageably seal with ground to be engaged while mining and disengaged while offline or changing mining locations,
- a nozzle entry hole configured to seal or attach to a nozzle from a rocket engine;
- a vapor manifold configured to collect the vapors from a volatile collector;
- the volatile collector configured to route the volatiles away from the interior volume into the vapor manifold; and
- a volatile exit from the vapor manifold.

16. The collection manifold of claim 15, wherein the collection manifold has a sealing lip extending groundward from sidewalls of the collection manifold configured to penetrate the ground and form a vapor barrier that prevents escape of volatiles from under the collection manifold.

17. The collection manifold of claim 15, further comprising a cold trap and piping leading to a liquid storage tank.

18. The collection manifold of claim 15, further comprising a vent configured to vent undesirable volatiles to an environment outside of the collection manifold.

19. The collection manifold of claim 15, further comprising a regolith separator that prevents solid regolith particles from exiting the collection manifold en route to a cold trap.

20. A water mining system, comprising:
- an excavation system comprising a rocket engine, a collection manifold, a condenser, and a water storage tank;
- a plume from the rocket engine configured to penetrate regolith beneath the collection manifold;
- the condenser being configured to condense volatiles resulting from the plume penetration of the regolith; and
- the water storage tank is configured to store water from the condensed volatiles in liquid or frozen form,
- wherein the excavation system weighs less than 150 kg and is configured to extract at least 400 kg of water in under 4 days.

* * * * *